US012769401B2

(12) United States Patent
Won et al.

(10) Patent No.: US 12,769,401 B2
(45) Date of Patent: Oct. 20, 2026

(54) ELECTRONIC APPARATUS FOR DETECTING MOTION GESTURE, AND OPERATION METHOD THEREFOR

(71) Applicant: Samsung Electronics Co., Ltd., Suwon-si (KR)

(72) Inventors: Hyunsuk Won, Suwon-si (KR); Byungjun Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 18/441,425

(22) Filed: Feb. 14, 2024

(65) Prior Publication Data

US 2024/0184379 A1 Jun. 6, 2024

Related U.S. Application Data

(63) Continuation of application No. PCT/KR2022/007737, filed on May 31, 2022.

(30) Foreign Application Priority Data

Aug. 18, 2021 (KR) ........................ 10-2021-0108937

(51) Int. Cl.
*G06F 3/01* (2006.01)
*G06V 40/20* (2022.01)

(52) U.S. Cl.
CPC .............. *G06F 3/017* (2013.01); *G06V 40/28* (2022.01)

(58) Field of Classification Search
None
See application file for complete search history.

(56) References Cited

U.S. PATENT DOCUMENTS 9,671,867 B2 6/2017 Bachfischer et al.
9,857,878 B2 1/2018 Lee et al.
(Continued)

FOREIGN PATENT DOCUMENTS

KR 10-2016-0079531 A 7/2016
KR 10-2020-0028771 A 3/2020

OTHER PUBLICATIONS

International Search Report dated Sep. 15, 2022, issued in International Application No. PCT/KR2022/007737.
(Continued)

*Primary Examiner* — Tuan S Nguyen
(74) *Attorney, Agent, or Firm* — Jefferson IP Law, LLP

(57) ABSTRACT

An electronic device including a camera, a processor and memory storing instructions is provided. The instructions, when executed by the processor, cause the electronic device to acquire image frames including a first image frame and a second image frame by using a camera, determine, as a first field of view (FOV), a FOV between a first axis and a first direction, in which an object related to motion is oriented, when the object is recognized in the first image frame, determine, as a second FOV, a FOV between the first axis and a second direction in which the object recognized in the second image frame following the first image frame is oriented, recognize a first motion gesture in response to the first FOV being at most a first critical FOV, the second FOV being at least a second critical FOV, and perform a first function corresponding to the first motion gesture in response to the recognition of the first motion gesture.

20 Claims, 10 Drawing Sheets

(56) References Cited

U.S. PATENT DOCUMENTS

| | | | | |
|---|---|---|---|---|
| 10,846,942 | B1 | 11/2020 | Horowitz et al. | |
| 10,863,091 | B2 | 12/2020 | Song et al. | |
| 11,404,056 | B1 * | 8/2022 | Meisenholder | G06T 7/246 |
| 2012/0262372 | A1 * | 10/2012 | Kim | G06F 1/1694<br>345/158 |
| 2013/0142383 | A1 * | 6/2013 | Viswanathan | G06F 3/017<br>382/103 |
| 2013/0241819 | A1 | 9/2013 | Yamashita | |
| 2015/0002391 | A1 * | 1/2015 | Chen | H04N 23/56<br>345/156 |
| 2016/0091976 | A1 | 3/2016 | Kumar et al. | |
| 2016/0132124 | A1 | 5/2016 | Nakamura et al. | |
| 2016/0147294 | A1 | 5/2016 | Bae et al. | |
| 2016/0187990 | A1 | 6/2016 | Lee et al. | |
| 2017/0168584 | A1 | 6/2017 | Tanimura | |
| 2019/0041994 | A1 | 2/2019 | Cho | |
| 2020/0348758 | A1 | 11/2020 | Zhang et al. | |
| 2021/0191526 | A1 | 6/2021 | Heo et al. | |

OTHER PUBLICATIONS

Korean Notice of Patent Grant dated Aug. 31, 2026, issued in Korean Application No. 10-2021-0108937.

* cited by examiner

ELECTRONIC APPARATUS FOR DETECTING MOTION GESTURE, AND OPERATION METHOD THEREFOR

CROSS-REFERENCE TO RELATED APPLICATION(S)

This application is a continuation application, claiming priority under § 365(c), of an International application No. PCT/KR2022/007737, filed on May 31, 2022, which is based on and claims the benefit of a Korean patent application number 10-2021-0108937, filed on Aug. 18, 2021, in the Korean Intellectual Property Office, the disclosure of which is incorporated by reference herein in its entirety.

BACKGROUND

1. Field

The disclosure relates to a technology for detecting a motion gesture by using a camera.

2. Description of Related Art

Recently, as the functions of mobile devices have diversified, the latest technologies enabling the convenient use of the mobile devices are being developed. For example, the mobile devices provide a function of recognizing a user gesture.

An electronic device recognizes a user gesture by using a visual sensor, such as a camera. The user gesture includes a static gesture, such as an OK gesture, a dynamic gesture, such as writing letters by moving the hand, and a motion gesture, such as swipe or tap.

The above information is presented as background information only to assist with an understanding of the disclosure. No determination has been made, and no assertion is made, as to whether any of the above might be applicable as prior art with regard to the disclosure.

SUMMARY

According to the gesture recognition technology of the related art, there is an issue that it is difficult for an electronic device to accurately recognize a repetitive motion gesture. When a specific motion gesture is repeatedly performed, there is an issue that an electronic device of the related art recognizes a user's unintended motion gesture along with the motion gesture. For example, when a user repeatedly performs a swipe left gesture, there is a problem that the electronic device of the related art recognizes a swipe right gesture between swipe left gestures, together. When the electronic device recognizes a motion gesture different from a user's intention, the usability of the electronic device is decreased.

Aspects of the disclosure are to address at least the above-mentioned problems and/or disadvantages and to provide at least the advantages described below. Accordingly, an aspect of the disclosure is to provide a technology for detecting a motion gesture by using a camera.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a processor, and memory storing instructions. The instructions, when executed by the processor, cause the electronic device to acquire image frames including a first image frame and a second image frame by using the camera, and when an object related to motion is recognized in the first image frame, determine, as a first field of view (FOV), a field of view (FOV) between a first axis and a first direction in which the object is oriented, determines whether the first FOV is less than or equal to a first critical field of view (FOV), determine, as a second field of view (FOV), a field of view (FOV) between the first axis and a second direction in which the object recognized in the second image frame following the first image frame is oriented, determine whether the first direction and the second direction are oriented in different directions with respect to the first axis and whether the second FOV is greater than or equal to a second critical field of view (FOV), recognize a first motion gesture, in response to the first FOV being less than or equal to the first critical FOV, the first direction and the second direction being oriented in different directions with respect to the first axis, and the second FOV being greater than or equal to the second critical FOV, and perform a first function corresponding to the first motion gesture in response to recognizing the first motion gesture.

In accordance with another aspect of the disclosure, a method is provided. The method includes acquiring image frames including a first image frame and a second image frame by using a camera included in the electronic device, and when an object related to motion is recognized in the first image frame, determining, as a first field of view (FOV), a field of view (FOV) between a first axis and a first direction in which the object is oriented, determining whether the first FOV is less than or equal to a first critical field of view (FOV), determining, as a second field of view (FOV), a field of view (FOV) between the first axis and a second direction in which the object recognized in the second image frame following the first image frame is oriented, determining whether the first direction and the second direction are oriented in different directions with respect to the first axis and whether the second FOV is greater than or equal to a second critical field of view (FOV), recognizing a first motion gesture, in response to the first FOV being less than or equal to the first critical FOV, the first direction and the second direction being oriented in different directions with respect to the first axis, and the second FOV being greater than or equal to the second critical FOV, and performing a first function corresponding to the first motion gesture in response to recognizing the first motion gesture.

In accordance with another aspect of the disclosure, an electronic device is provided. The electronic device includes a camera, a processor, and memory storing instructions. The instructions, when executed by the processor, cause the electronic device to acquire image frames including a first image frame and a second image frame by using the camera, and when an object related to motion is recognized in the first image frame, determine, as a first field of view (FOV), a field of view (FOV) between a first axis and a first direction in which the object is oriented, and determine whether the first FOV is less than or equal to a first critical field of view (FOV), determine, as a second field of view (FOV), a field of view (FOV) between the first axis and a second direction in which the object recognized cross the first axis in the second image frame following the first image frame is oriented, determine whether the second FOV is greater than or equal to a second critical field of view (FOV), recognize a first motion gesture, in response to the first FOV being less than or equal to the first critical FOV and the second FOV being greater than or equal to the second critical FOV, and perform a first function corresponding to the first motion gesture in response to recognizing the first motion gesture.

According to various embodiments of the disclosure, the accuracy of recognizing a motion gesture in an electronic device is increased. The electronic device does not recognize a user's unintended motion gesture among specific motion gestures that are repeatedly performed. For example, when a user repeatedly performs a swipe left gesture, the electronic device does not recognize a swipe right gesture between the swipe left gestures. Therefore, when the user wishes to execute a specific function through a motion gesture, the usability of the electronic device increases.

According to various embodiments of the disclosure, the reliability of recognizing a motion gesture in the electronic device increases. The electronic device does not recognize a user's unintended motion gesture.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
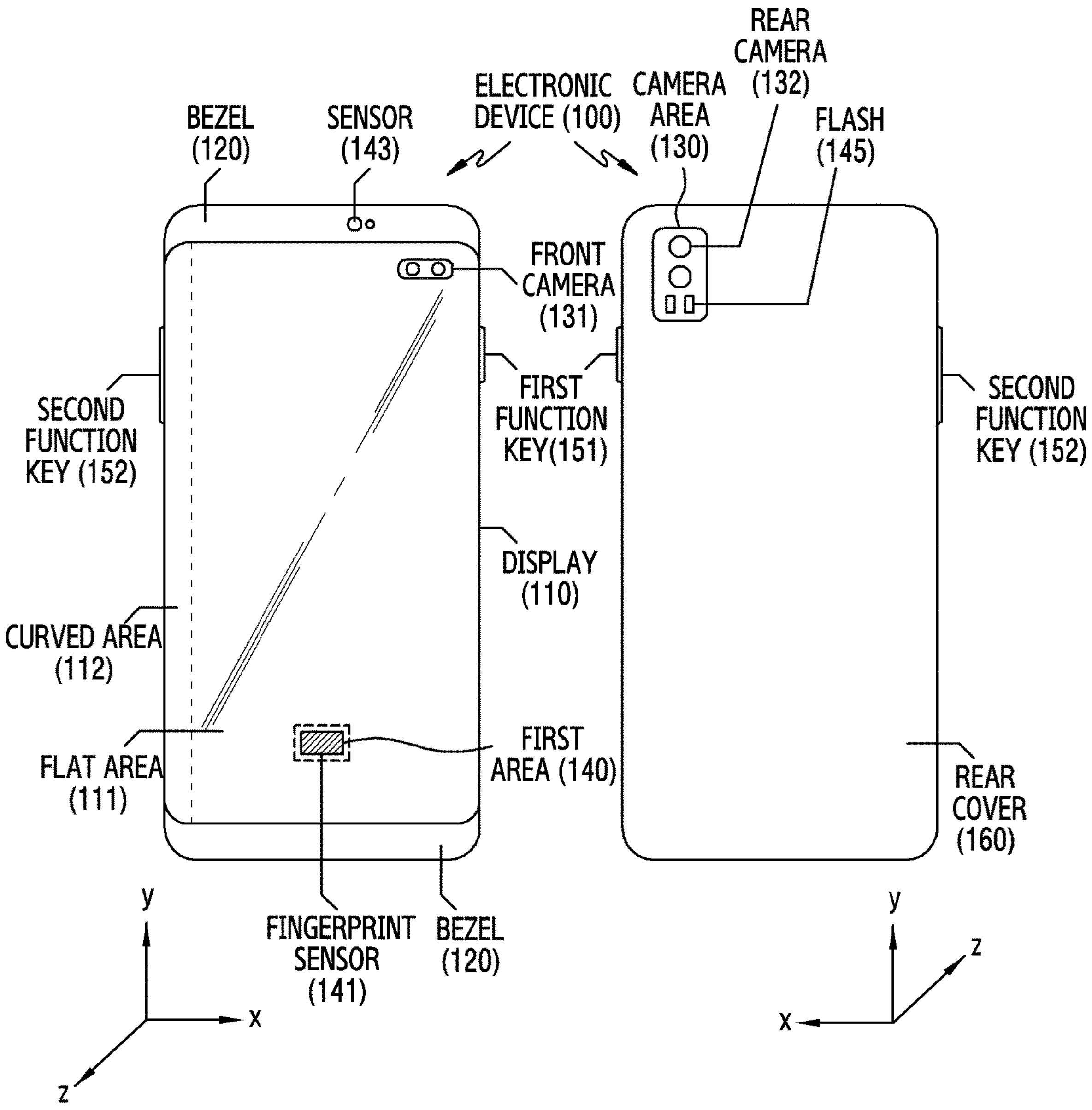
FIG. 1 illustrates an electronic device according to an embodiment of the disclosure.

FIG. 1 illustrates an electronic device according to an embodiment of the disclosure.

Referring to FIG. 1, a display 110 may be disposed on a front surface of an electronic device 100 of an embodiment. In an embodiment of the disclosure, the display 110 may occupy most of the front surface of the electronic device 100. The display 110 and a bezel 120 area surrounding at least a portion of an edge of the display 110 may be disposed on the front surface of the electronic device 100. In the example of FIG. 1, the display 110 may include a flat area 111, and a curved area 112 that extends from the flat area 111 toward a side surface of the electronic device 100. In FIG. 1, the curved area 112 is displayed only at one side (e.g., a left side), but it may be understood that a curved area is identically formed at an opposite side as well. In addition, the electronic device 100 shown in FIG. 1 is an example, and various embodiments are possible. For example, the display 110 of the electronic device 100 may include only the flat area 111 without the curved area 112, or include the curved area 112 only at an edge of one side instead of both sides. In addition, in an embodiment of the disclosure, a curved area extends to a rear surface of the electronic device 100, so that the electronic device 100 may have an additional flat area as well.

In an embodiment of the disclosure, a horizontal direction of the display 110 may be referred to as an x-axis direction, and a vertical direction may be referred to as a y-axis direction. For another example, a direction of a short surface of the electronic device 100 may be referred to as the x-axis direction, and a direction of a long surface may be referred to as the y-axis direction. In addition, a direction in which a front surface of the display 110 is oriented may be referred to as a +z direction. In another embodiment of the disclosure, a thickness direction of the electronic device 100 may be also referred to as a z-axis direction.

In an embodiment of the disclosure, a fingerprint sensor 141 for recognizing a user's fingerprint may be included in a first area 140 of the display 110. The fingerprint sensor 141 is disposed on a lower layer of the display 110, so it is not recognized by a user or is difficult to be recognized. In addition, in addition to the fingerprint sensor 141, a sensor for additional user/biometric authentication may be disposed in a partial area of the display 110. In another embodiment of the disclosure, the sensor for user/biometric authentication may be disposed in one area of a bezel 120. For example, an IR sensor for iris authentication may be exposed through one area of the display 110 or be exposed through one area of the bezel 120.

In an embodiment of the disclosure, a sensor 143 may be included in at least one area of the bezel 120 of the electronic device 100 or at least one area of the display 110. The sensor 143 may be a sensor for detecting a distance and/or a sensor for detecting an object. The sensor 143 may be disposed adjacent to a camera module (e.g., a front camera 131 and a rear camera 132) or be formed as one module with the camera module. For example, the sensor 143 may operate as at least part of an infrared (IR) camera (e.g., a time of flight (TOF) camera, and a structured light camera) or operate as at least part of a sensor module.

In an embodiment of the disclosure, the front camera 131 may be disposed on the front surface of the electronic device 100. In the embodiment of FIG. 1, the front camera 131 is shown as being exposed through one area of the display 110, but in another embodiment of the disclosure, the front camera 131 may be exposed through the bezel 120. In the disclosure, a direction in which the front camera 131 is oriented may be referred to as the +z direction, and the z-axis may be referred to as or mentioned as a first axis.

In an embodiment of the disclosure, at least one or more of the sensor module, the camera module (e.g., the front camera 131 and the rear camera 132), and a light-emitting device (e.g., light-emitting diode (LED)) may be disposed on a back surface of a screen display area (e.g., the flat area 111 and the curved area 112) of the display 110.

In an embodiment of the disclosure, the camera module may be disposed on a back surface of at least one of the front surface, side surface, and/or rear surface of the electronic device 100 to face the front surface, the side surface, and/or the rear surface. For example, the front camera 131 may include a hidden under display camera (UDC) that is not visually exposed to the screen display area (e.g., the flat area 111 and the curved area 112). In an embodiment of the disclosure, the electronic device 100 may include one or more front cameras 131. For example, the electronic device 100 may include two front cameras, such as a first front camera and a second front camera. In an embodiment of the disclosure, the first front camera and the second front camera may be cameras of the same type with the same specifications (e.g., pixels), but the first front camera and the second front camera may be implemented as cameras with different specifications. The electronic device 100 may support dual camera-related functions (e.g., three-dimensional (3D) shooting, auto focus, or the like) through two front cameras.

In an embodiment of the disclosure, the rear camera 132 may be disposed on the rear surface of the electronic device 100. The rear camera 132 may be exposed through a camera area 130 of a rear cover 160. In an embodiment of the disclosure, the electronic device 100 may include a plurality of rear cameras disposed in the camera area 130. For example, the electronic device 100 may include two or more rear cameras. For example, the electronic device 100 may include a first rear camera, a second rear camera, and a third rear camera. The first rear camera, the second rear camera, and the third rear camera may have different specifications. For example, fields of view (FOV), pixels, apertures of the first rear camera, the second rear camera, and/or the third rear camera, whether optical zoom/digital zoom is supported, whether image stabilization function is supported, and the type and/or arrangement of lens sets included in each camera may be different from one another. For example, the first rear camera may be a general camera, the second rear camera may be a camera for wide shooting (e.g., a wide-angle camera), and the third rear camera may be a camera for telephoto shooting. In the embodiments of the disclosure, the description of functions or characteristics of the front camera may be applied to the rear camera, and vice versa. In the disclosure, a direction in which the rear camera 132 is oriented may be referred to as a −z direction, and the z-axis may be referred to or mentioned as the first axis.

In an embodiment of the disclosure, various hardware or sensors that assist shooting, such as a flash 145, may be additionally disposed in the camera area 130. For example, various sensors, such as a distance sensor for detecting a distance between a subject and the electronic device 100 may be further included.

In an embodiment of the disclosure, the distance sensor may be disposed adjacent to a camera module (e.g., the rear camera 132) or may be formed as one module with the camera module. For example, the distance sensor may operate as at least part of an infrared (IR) camera (e.g., a time of flight (TOF) camera, a structured light camera) or operate as at least part of a sensor module. For example, the TOF camera may operate as at least part of the sensor module for detecting a distance to the subject.

In an embodiment of the disclosure, at least one physical key may be disposed at a side part of the electronic device 100. For example, a first function key 151 for turning ON/OFF the display 110 or turning ON/OFF the power of the electronic device 100 may be disposed at an edge of the right side (e.g., +x direction) of the front surface of the electronic device 100. In an embodiment of the disclosure, a second function key 152 for controlling a volume or a screen brightness, or the like, of the electronic device 100 may be disposed at an edge of the left side (e.g., −x direction) of the front surface of the electronic device 100. In addition to this, an additional button or key may be also disposed on the front surface (e.g., +z direction) or rear surface (e.g., −z direction) of the electronic device 100. For example, a physical button or touch button mapped to a specific function may be disposed in a lower area of the front bezel 120.

The electronic device 100 shown in FIG. 1 corresponds to one example, and does not limit the form of a device to which a technical idea disclosed in the disclosure is applied. For example, the technical idea disclosed in the disclosure may be also applied to a foldable electronic device that may be folded horizontally or vertically by employing a flexible display 110 and a hinge structure. In addition, although the electronic device 100 of the illustrated example illustrates a bar-type or plate-type appearance, various embodiments of the disclosure are not limited thereto. For example, the illustrated electronic device may be part of a rollable electronic device. The rollable electronic device may be understood as an electronic device in which the display 110 is possible to be bent and deformed and at least a portion is possible to be wound or rolled or be accepted inside the electronic device 100. The rollable electronic device may expand and use the screen display area (e.g., the flat area 111, the curved area 112) by expanding the display 110 or exposing a larger area of the display 110 to the outside according to user's needs. The display 110 may also be referred to as a slide-out display or an expandable display.

Hereinafter, for convenience of description, various embodiments will be described based on the electronic device 100 shown in FIG. 1.

Figure 2:
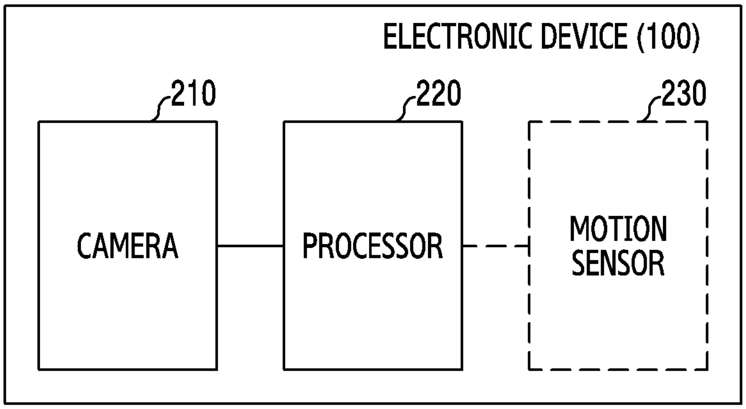
FIG. 2 is a block diagram illustrating a construction of an electronic device according to an embodiment of the disclosure.

FIG. 2 is a block diagram illustrating a construction of an electronic device according to an embodiment of the disclosure.

Referring to FIG. 2, the electronic device 100 may include a camera 210 and a processor 220. According to an embodiment of the disclosure, the electronic device 100 of FIG. 2 may be understood as the electronic device 100 of FIG. 1.

According to an embodiment of the disclosure, the camera 210 may acquire an image frame corresponding to an optical signal inputted to an image sensor, and may provide the image frame to the processor 220. The processor 220 may acquire image frames by using the camera 210.

According to an embodiment of the disclosure, the camera 210 may be understood as a front camera 131 or a rear camera 132 of FIG. 1. The processor 220 may acquire image frames including a subject (e.g., a user) through the camera 210. For example, the processor 220 may acquire image frames including the user's hands through the front camera 131. For another example, the processor 220 may also acquire image frames including a specific thing (e.g., a digital pen, an external electronic device) through the camera 210.

According to an embodiment of the disclosure, the processor 220 may be understood as including at least one processor. For example, the processor 220 may include at least one of an application processor (AP), an image signal processor (ISP), and a communication processor (CP).

According to an embodiment of the disclosure, the processor 220 may acquire image frames by using the camera 210, and may recognize a motion gesture, based on the image frames. For example, the processor 220 may recognize the motion gesture by analyzing the image frames. The motion gesture may include a swipe gesture and a tap gesture. For example, the electronic device 100 may detect a swipe gesture or a tap gesture, based on the image frames. Regarding the recognition of the motion gesture, a description will be made later with reference to FIGS. 3 to 8.

According to an embodiment of the disclosure, in response to recognizing a motion gesture, the processor 220 may perform a specific function corresponding to the motion gesture. For example, in response to recognizing a swipe gesture while running a camera application, the processor 220 may change a shooting mode of controlling the camera 210. For another example, in response to recognizing the swipe gesture while running the camera application, the processor 220 may display at least one previously captured image on the display 110. In addition, various functions that can be implemented by a person skilled in the art may be executed.

According to an embodiment of the disclosure, the electronic device 100 may further include a motion sensor 230. The processor 220 may detect the movement of the electronic device 100 through the motion sensor 230. In an embodiment of the disclosure, the motion sensor 230 may include an acceleration sensor, a gyro sensor (gyroscope), a magnetic sensor, or a Hall sensor. In an embodiment of the disclosure, the acceleration sensor is a sensor set to measure acceleration acting on three axes (e.g., x-axis, y-axis, or z-axis) of the electronic device 100, and may measure, estimate, and/or detect the force being applied to the electronic device 100 by using the measured acceleration. However, the above sensors are examples, and the motion sensor may further include at least one other type of sensor.

According to an embodiment of the disclosure, while image frames are acquired from the camera 210, the processor 220 may acquire motion data corresponding to the movement of the electronic device 100 by using the motion sensor 230. The processor 220 may recognize a first motion gesture based on the motion data. Regarding the motion data, a description will be made later with reference to FIG. 5.

Figure 3:
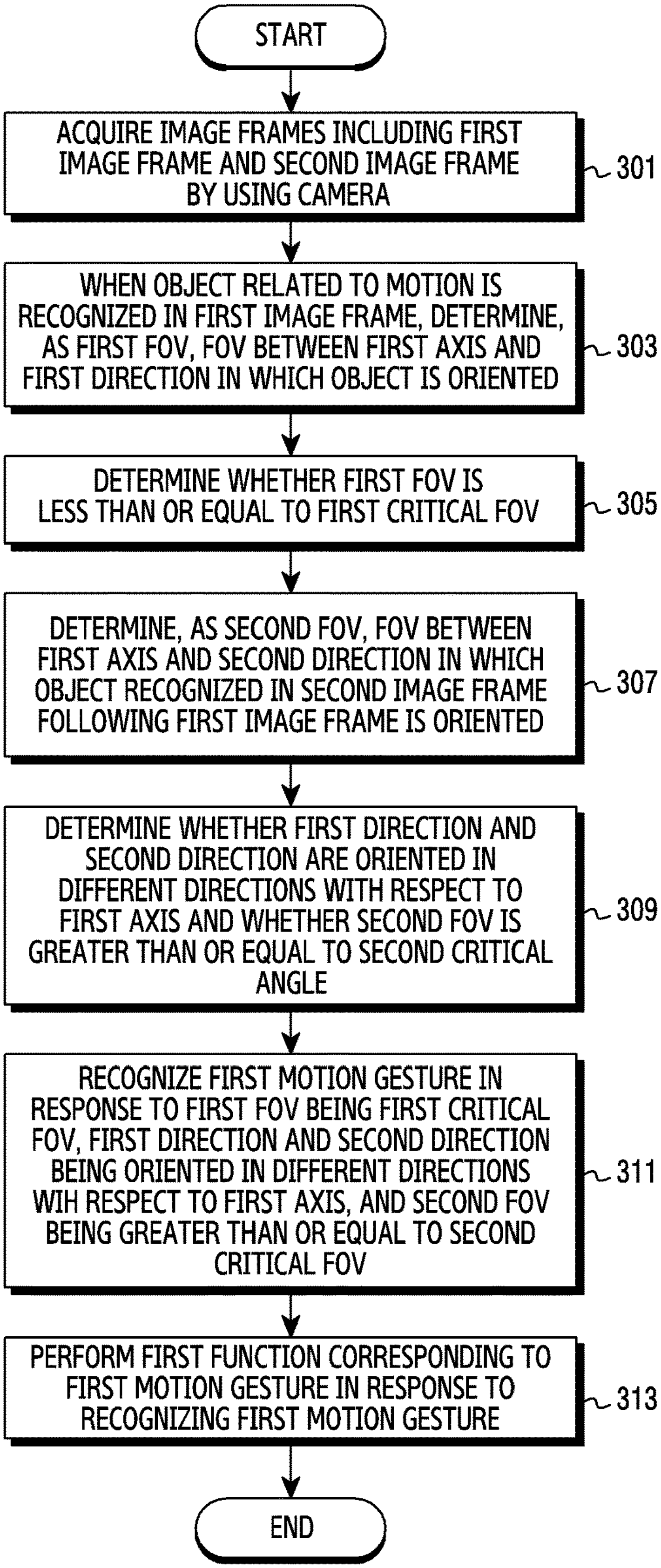
FIG. 3 is a flowchart illustrating an operation of detecting a first motion gesture in an electronic device according to an embodiment of the disclosure.

FIG. 3 is a flowchart illustrating an operation of detecting a first motion gesture in an electronic device according to an embodiment of the disclosure. Operations described in FIG. 3 may be performed by the electronic device 100 of FIG. 1 or the processor 220 of FIG. 2.

Referring to FIG. 3, according to an embodiment of the disclosure, in operation 301, the processor 220 may acquire image frames including a first image frame and a second image frame by using the camera 210. While a camera application is running, the processor 220 may acquire the image frames by using the camera 210, and may perform operation 303 to operation 313 below, based on the acquired image frames.

According to an embodiment of the disclosure, in operation 303, when an object related to motion is recognized in the first image frame, the processor 220 may determine, as a first field of view (FOV), a field of view (FOV) between a first axis and a first direction in which the object is oriented.

According to an embodiment of the disclosure, the object related to motion may include a user's hand. The processor 220 may recognize the user's hand in the first image frame. The processor 220 may determine, as the first FOV, the FOV between the first axis and the first direction in which the user's hand is oriented in the first image frame. For example, the direction in which the user's hand is oriented may be a direction in which the fingertip is oriented based on the wrist. For another example, the direction in which the user's hand is oriented may be a direction in which the fingertip is oriented based on a boundary point between the finger and the palm.

According to an embodiment of the disclosure, the object related to motion may include a thing satisfying a specified condition. For example, the object may mean a digital pen linked to the electronic device 100. For another example, the object may also be an external electronic device connected to the electronic device 100 through a wireless communication network. The processor 220 may determine, as the first FOV, the FOV between the first axis and the first direction in which the thing is oriented in the first image frame. For example, the direction in which the thing is oriented may mean a direction in which a second point is oriented based on a first point of the thing. For another example, the direction in which the thing is oriented may also mean a direction in which a specific point of the thing is oriented based on the user's wrist.

According to an embodiment of the disclosure, the first axis may correspond to a direction in which the camera 210 is oriented. For example, the first axis may refer to the z-axis shown in FIG. 1. The processor 220 may determine, as the first FOV, the FOV between the first axis and the first direction. Regarding the first axis, first direction, and first FOV, a description will be made later with reference to FIG. 4.

According to an embodiment of the disclosure, the processor 220 may determine the first FOV, based on the first image frame. The processor 220 may determine the first FOV by analyzing the first image frame. For example, the processor 220 may determine the first direction in which the object is oriented through artificial intelligence (AI) image analysis of the first image frame, and determine the FOV between the first axis and the first direction. For example, when the object is the user's hand, the processor 220 may determine points corresponding to the joints of the hand included in the first image frame through image analysis, and determine a direction in which the user's hand is oriented, based on the points corresponding to the joints. According to another embodiment of the disclosure, the processor 220 may also determine the first FOV, based on the first image frame and other information. For example, the processor 220 may acquire location information of an object through wireless communication with the object (e.g., an external electronic device), and determine the first direction in which the object is oriented, based on the first image frame and the location information.

According to an embodiment of the disclosure, in operation 305, the processor 220 may determine whether the first FOV is less than or equal to a first critical field of view (FOV). For example, the first critical FOV is 45 degrees, and the processor 220 may determine whether the first FOV is 45 degrees or less. Regarding the first critical FOV, a description will be made later with reference to FIG. 4.

According to an embodiment of the disclosure, in operation 307, the processor 220 may determine, as a second field of view (FOV), the FOV between the first axis and a second direction in which the object recognized in the second image frame following the first image frame is oriented. Among the contents described in operation 303, the description of the object and the first axis may also be applied to operation 307.

According to an embodiment of the disclosure, in response to determining that the first FOV is less than or equal to the first critical FOV in operation 305, the processor 220 may perform operation 307. According to another embodiment of the disclosure, the processor 220 may also perform operation 307 regardless of whether the first FOV is less than or equal to the first critical FOV in operation 305.

According to an embodiment of the disclosure, the processor 220 may determine the second FOV, based on the second image frame. The processor 220 may determine the second FOV by analyzing the second image frame. For example, the processor 220 may determine a second direction in which the object is oriented, through artificial intelligence image analysis of the second image frame, and determine the FOV between the first axis and the second direction. For example, when the object is a user's hand, the processor 220 may determine points corresponding to the joints of the hand included in the second image frame through image analysis, and may determine a direction in which the user's hand is oriented, based on the points corresponding to the joints. According to another embodiment of the disclosure, the processor 220 may also determine the second FOV, based on the first image frame and other information. For example, the processor 220 may acquire location information of an object through wireless communication with the object (e.g., the external electronic device), and may determine the second direction in which the object is oriented, based on the second image frame and the location information.

According to an embodiment of the disclosure, the processor 220 may also determine, as the second FOV, the FOV between the first axis and the second direction in which the object recognized across the first axis in the second image frame following the first image frame is oriented. Regarding the object recognized across the first axis, a description will be made later with reference to FIG. 4.

According to an embodiment of the disclosure, in operation 309, the processor 220 may determine whether the first direction and the second direction are oriented in different directions with respect to the first axis and whether the second FOV is greater than or equal to a second critical field of view (FOV).

According to an embodiment of the disclosure, the processor 220 may determine whether the first direction and the second direction are oriented in different directions, based on the first axis. In the disclosure, different directions based on the first axis may mean directions oriented toward different areas among virtual areas divided centering on the first axis. Regarding the first direction and the second direction, a description will be made later with reference to FIG. 4.

According to an embodiment of the disclosure, the second critical FOV may be a value different from the first critical FOV. In an embodiment of the disclosure, the second critical FOV may have a greater value than the first critical FOV. For example, the second critical FOV is 60 degrees, and the processor 220 may determine whether the second FOV is 60 degrees or more. Regarding the first critical FOV and the second critical FOV, a description will be made later with reference to FIG. 4.

According to an embodiment of the disclosure, in operation 311, the processor 220 may recognize a first motion gesture, in response to the first FOV being less than or equal to the first critical FOV, the first direction and the second direction being oriented in different directions with respect to the first axis, and the second FOV being greater than or equal to the second critical FOV. The first motion gesture may include a swipe gesture. For example, the first motion gesture may be any one of a swipe left gesture, a swipe right gesture, a swipe up gesture, or a swipe down gesture.

According to an embodiment of the disclosure, in operation 313, in response to recognizing the first motion gesture, the processor 220 may perform a first function corresponding to the first motion gesture. For example, in response to recognizing the first motion gesture (e.g., the swipe right gesture) while running a camera application, the processor 220 may change a shooting mode of controlling the camera 210. For another example, in response to recognizing the first motion gesture (e.g., the swipe left gesture) while running the camera application, the processor 220 may also display a previously captured image on the display 110.

According to an embodiment of the disclosure, as shown in FIG. 3, when the object is recognized in the first image frame, the processor 220 may determine the first FOV in the first image frame, and, unlike shown in FIG. 3, in response to the object that satisfies a specified condition being recognized in a specified number of image frames among the image frames acquired from the camera 210, the processor 220 may also determine the first FOV in the first image frame. The processor 220 may acquire image frames from the camera 210 and, in response to the object that satisfies a specified condition being recognized in a first number of consecutive image frames among the image frames, the processor 220 may determine, as the first FOV, the FOV between the first axis and the first direction in a first image frame following the first number of image frames. For example, the specified condition may mean that a range in which an object related to motion moves in the image frames is within a certain range. When a location at which an object (e.g., a user's hand) is recognized in a first number or more of image frames acquired from the camera 210 and/or a field of view (FOV) at which the object is oriented are not moved, the processor 220 may determine whether the object satisfying the specified condition is recognized. Even when it is determined that the location at which the object is recognized in the first number or more of image frames acquired from the camera 210 and/or the FOV at which the object is oriented are moved within a certain range, the processor 220 may determine that the object satisfying the specified condition is recognized.

According to an embodiment of the disclosure, the processor 220 may determine whether an object satisfying a specified condition is recognized in a specified number of image frames. At this time, the specified number (e.g., a first number) may be a constant that is changeable depending on the user's settings or shooting environment. The specified number (e.g., the first number), a constant stored in the electronic device 100, may also be a constant that does not change. According to an embodiment of the disclosure, the specified number (e.g., the first number) may correspond to a specified time. For example, when it is determined that an object (e.g., a user's hand) related to motion satisfies a specified condition in image frames captured during a specified time, the processor 220 may determine the first FOV in the first image frame. For example, when determining that the object does not move during a specified time or a negligible small amount of movement is detected, the processor 220 may determine that the first motion gesture has started, and may determine the first FOV in the first image frame.

Although not shown in FIG. 3, the electronic device 100 of an embodiment may recognize a start gesture satisfying a first condition, determine whether a second condition related to recognition of an end gesture is satisfied after the start gesture is recognized, recognize the end gesture satisfying the second condition, and determine that a first motion gesture has been recognized when the start gesture and the end gesture are recognized. For example, the first condition may include a condition regarding whether a location of an object included in an image frame is maintained during a specified time, and a condition related to a direction (e.g., the first direction) in which the object is oriented. For example, the second condition may include a condition related to a direction (e.g., the second direction) in which the object included in the image frame is oriented. The second condition may further include a condition regarding whether the end gesture is recognized within a specified number of image frames after the start gesture is recognized.

According to an embodiment of the disclosure, the processor 220 may acquire image frames by using the camera 210. The processor 220 may determine whether an object (e.g., a user's hand) satisfying a specified condition (e.g., not moving, or moving negligibly a little) is recognized in the image frames for a specified time (e.g., 1 second, 0.5 second). For example, the processor 220 may determine whether the object satisfying the specified condition is recognized in a specified number of image frames among the image frames.

According to an embodiment of the disclosure, in response to recognizing the object satisfying the specified condition during the specified time in the image frames, the processor 220 may determine, as a first field of view (FOV), the FOV between a first axis and a first direction. According to an embodiment of the disclosure, the processor 220 may determine whether the first FOV is less than or equal to a first critical field of view (FOV). In response to determining that the first FOV is less than or equal to the first critical FOV, the processor 220 may determine that a start gesture has been recognized. For example, when determining the object is recognized for the specified time in the image frames acquired from the camera 210, and the first FOV between the first axis and the first direction in which the object is oriented is less than or equal to the first critical FOV, the processor 220 may determine that the first condition is satisfied, and recognize the start gesture.

According to an embodiment of the disclosure, in response to recognizing the start gesture, the processor 220 may perform an operation of recognizing the end gesture. For example, the processor 220 may determine whether the second condition is met in response to the start gesture being recognized.

According to an embodiment of the disclosure, after the start gesture is recognized, the processor 220 may determine, as the second FOV, the FOV between the first axis and the second direction in which the object is oriented, in the second image frame acquired from the camera 210. The processor 220 may determine whether the second direction is oriented in a different direction, based on the first direction and the first axis, and whether the second FOV is greater than or equal to the second critical FOV. According to an embodiment of the disclosure, the processor 220 may determine that the end gesture is recognized, in response to determining that the first direction and the second direction are oriented in different directions with respect to the first axis and that the second FOV is greater than or equal to the second critical FOV. For example, after the processor 220 recognizes the start gesture as the first condition is satisfied, the processor 220 may determine whether the second condition is satisfied, and in response to the object that is included in the image frame satisfying the second condition, the processor 220 may recognize the end gesture.

According to an embodiment of the disclosure, the processor 220 may recognize the start gesture satisfying the first condition, determine whether the second condition is met in response to recognizing the start gesture, and recognize the end gesture in response to determining that the second condition is satisfied. In response to recognizing the start gesture and the end gesture, the processor 220 may determine that the first motion gesture is recognized. According to an embodiment of the disclosure, in response to recognizing the first motion gesture, the processor 220 may perform a first function corresponding to the first motion gesture.

Figure 4:
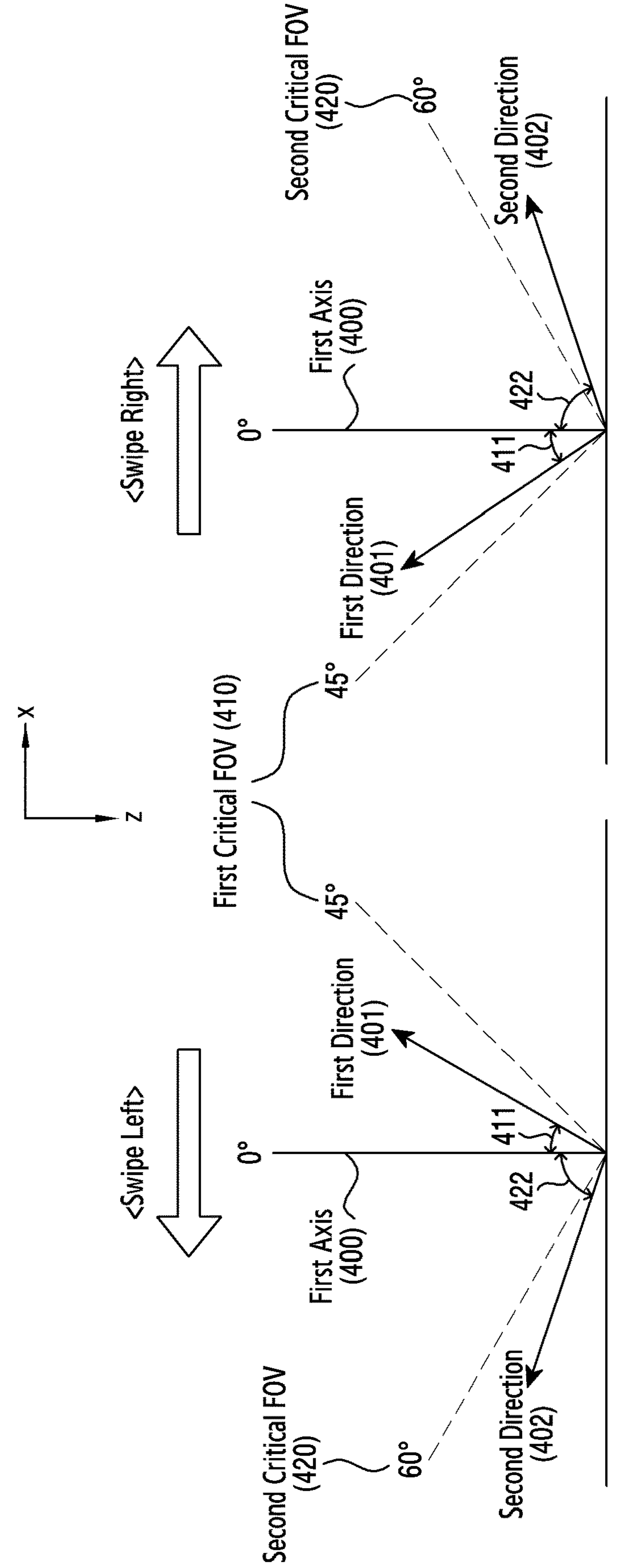
FIG. 4 illustrates a first motion gesture that may be recognized by an electronic device according to an embodiment of the disclosure.

FIG. 4 illustrates a first motion gesture that may be recognized by an electronic device according to an embodiment of the disclosure.

Referring to FIG. 4, the first motion gesture may include any one of a swipe left gesture or a swipe right gesture. FIG. 4 may be understood as being depicted on a z-x plane. For example, in FIG. 4, a +z-axis direction may be a direction in which the front camera 131 is oriented, and a +x-axis direction may be a horizontal direction of the electronic device 100. However, this is just an example, and embodiments of the disclosure may be applied even in a z-y plane in the case of a swipe up gesture or a swipe down gesture. However, for convenience of description, in FIG. 4, a description is made based on the swipe left gesture or swipe right gesture on the z-x plane. In addition, it will be clearly understood by those skilled in the art that a description of the swipe left gesture with respect to FIG. 4 may also be applied to the swipe right gesture.

According to an embodiment of the disclosure, a first axis 400 may correspond to a direction in which the camera 210 is oriented. For example, FIG. 4 illustrates that a user is located in a direction (e.g., the +z direction) in which the front camera 131 of the electronic device 100 is oriented, but embodiments of the disclosure may also be applied to a −z axis direction in which the rear camera 132 is oriented. However, in FIG. 4, for convenience of description, a description is made based on that the user is located in the direction (e.g., the +z direction) in which the front camera 131 is oriented.

According to an embodiment of the disclosure, the processor 220 may acquire image frames through the camera 210 (e.g., the front camera 131), and when an object related to motion is recognized in a first image frame, the processor 220 may determine, as a first field of view (FOV) 411, the FOV between the first axis 400 and a first direction 401 in which the object is oriented. When the object is a user's hand, the first direction 401 may be understood as a direction of going from the user's wrist to the fingertips.

According to an embodiment of the disclosure, in response to the object that satisfies a specified condition being recognized in a first number of image frames among image frames acquired through the camera 210, the processor 220 may determine, as the first FOV 411, the FOV between the first axis 400 and the first direction 401 in which the object is oriented in a first image frame following the first number of image frames.

According to an embodiment of the disclosure, the processor 220 may determine the first direction 401 through image analysis of the first image frame. The processor 220 may determine, as the first FOV 411, a field of view (FOV) by which the first direction 401 is inclined with respect to the first axis 400. For example, the processor 220 may determine, as the first FOV 411, the FOV between the first direction 401 and a direction (e.g., the −z direction) opposite to the direction (e.g., the +2 direction) in which the camera 210 (e.g., the front camera 131) is oriented.

According to an embodiment of the disclosure, the processor 220 may determine whether the first field of view (FOV) 411 is less than or equal to a first critical field of view (FOV) 410. For example, the first critical FOV 410 may be 45 degrees. For another example, the first critical FOV 410 may be set to 30 degrees, 40 degrees, or other various values.

According to an embodiment of the disclosure, the processor 220 may determine, as a second field of view (FOV) 422, the FOV between the first axis 400 and a second direction 402 in which the object recognized in a second image frame following the first image frame is oriented. When the object is a user's hand, the second direction 402 may be understood as a direction of going from the user's wrist to the fingertips. The processor 220 may determine the second direction 402 through image analysis of the second image frame. The processor 220 may determine, as the second FOV 422, a field of view (FOV) by which the second direction 402 is inclined with respect to the first axis 400. For example, the processor 220 may determine, as the second FOV 422, the FOV between the second direction 402 and the direction (e.g., the −z direction) opposite to the direction (e.g., the +z direction) in which the camera 210 (e.g., the front camera 131) is oriented.

According to an embodiment of the disclosure, the processor 220 may determine whether the second FOV 422 is greater than or equal to a second critical field of view (FOV) 420. In an embodiment of the disclosure, the second critical FOV 420 may have a greater value than the first critical FOV 410. For example, the second critical FOV 420 may be 60 degrees. For another example, the second critical FOV 420 may have various values set larger than the first critical FOV 410.

According to an embodiment of the disclosure, the processor 220 may determine whether the first direction 401 and the second direction 402 are oriented in different directions with respect to the first axis 400. For example, referring to FIG. 4, different directions based on the first axis 400 may mean that the first direction 401 is a +x direction centering on a z-axis, and the second direction 402 is a −x direction centering on the z-axis. For example, that the first direction 401 and the second direction 402 are oriented in different directions with respect to the first axis 400 may mean that the first direction 401 and the second direction 402 are oriented toward different areas, when an arbitrary plane (e.g., the z-x plane in FIG. 4) is divided into two areas with respect to the first axis 400 (e.g., a z-axis). For another example, that the first direction 401 and the second direction 402 are oriented in different directions with respect to the first axis 400 may also mean that the first direction 401 is a direction of rotating by the first FOV 411 clockwise around a y-axis with respect to the first axis 400, and the second direction 402 is a direction of rotating by the second FOV 422 counterclockwise around the y-axis with respect to the first axis 400. For example, the first direction 401 may be a direction of rotating, by the first FOV 411 clockwise around the y-axis, the direction (e.g., the −z direction) opposite to the direction (e.g., the +2 direction) in which the camera 210 (e.g., the front camera 131) is oriented, and the second direction 402 may be a direction of rotating, by the second FOV 422 counterclockwise around the y-axis, the direction (e.g., the −z direction) opposite to the direction in which the camera 210 is oriented. Accordingly, the first FOV 411 and the second FOV 422 may mean FOVs rotating in a yaw direction with respect to the electronic device 100. In an embodiment of the disclosure, in the case of the swipe up gesture or swipe down gesture, the first FOV and the second FOV may be FOVs rotating in a pitch direction.

According to an embodiment of the disclosure, the processor 220 may also determine, as the first FOV 411, the FOV between the first axis 400 and the first direction 401 in which the object is oriented in the first image frame, and determine, as the second FOV 422, the FOV between the first axis 400 and the second direction 402 in which the object recognized across the first axis 400 in the second image frame is oriented. When determining the second direction 402 in which the object recognized across the first axis 400 in the second image frame is oriented, the processor 220 may not determine whether the first direction 401 and the second direction 402 are oriented in different directions, based on the first axis 400. For example, when the processor 220 determines, as the second FOV 422, the FOV between the first axis 400 and the second direction 402 in which the object recognized across the first axis 400 in the second image frame is oriented, the processor 220 may determine whether the second FOV 422 is greater than or equal to the second critical FOV 420 without determining whether the first direction 401 and the second direction 402 are oriented the in different directions with respect to the first axis 400, in relation to operation 309 of FIG. 3.

According to an embodiment of the disclosure, when determining as the second FOV 422 the FOV between the first axis 400 and the second direction 402 in which the object recognized across the first axis 400 in the second image frame is oriented, the processor 220 may determine the first direction 401 in which the object is oriented in the first image frame, and then recognize the object crossing the first axis 400 in an image frame acquired between the first image frame and the second image frame. For example, the processor 220 may recognize the object oriented in a direction parallel to the first axis 400 in any one of the image frames acquired between the first image frame and the second image frame. For another example, the processor 220 may also determine that the FOV between the first axis 400 and a direction in which the object is oriented gradually decreases and then increases again in the image frames acquired between the first image frame and the second image frame.

According to an embodiment of the disclosure, the processor 220 may also recognize a first surface of the object oriented in the first direction 401 in the first image frame, and recognize a second surface of the object oriented in the second direction 402 in the second image frame. The first surface and the second surface may be surfaces of the object oriented in different directions. For example, the processor 220 may recognize the user's palm as the object in the first image frame, and recognize the back of the user's hand as the object in the second image frame. According to an embodiment of the disclosure, when the processor 220 recognizes different surfaces of the object in the first image frame and the second image frame, the processor 220 may determine that the first direction 401 and the second direction 402 are oriented in different directions, based on the first axis 400. Or, when the processor 220 recognizes the different surfaces of the object in the first image frame and the second image frame, the processor 220 may also determine that the object crossing the first axis 400 is recognized in the second image frame after recognizing the object in the first image frame.

According to an embodiment of the disclosure, the processor 220 may determine the first direction 401, the first FOV 411, the second direction 402, and the second FOV 422 on an arbitrary plane. For example, an object (e.g., a user's hand) related to motion may move in three dimensions in real space, but the processor 220 may determine a direction in which the object is oriented in two dimensions. For example, referring to FIG. 4, the processor 220 may determine the first direction 401, the first FOV 411, the second direction 402, and the second FOV 422 in a plane perpendicular to the front of the electronic device 100 and parallel to a horizontal direction (e.g., an x-axis) of the electronic device 100. The plane perpendicular to the front of the electronic device 100 and parallel to the horizontal direction of the electronic device 100 may be a z-x plane. In an embodiment of the disclosure, in the case of a swipe up gesture or a swipe down gesture, the processor 220 may determine the first direction, the first FOV, the second direction, and the second FOV on a plane (e.g., a z-y plane) perpendicular to the front of the electronic device 100 and parallel to a vertical direction of the electronic device 100.

According to an embodiment of the disclosure, the processor 220 may increase the accuracy of recognizing a first motion gesture, by recognizing a first motion gesture through whether the first FOV 411 is less than or equal to the first critical FOV 410 and the second FOV 422 is greater than or equal to the second critical FOV 420. The processor 220 may improve the accuracy of recognizing the first motion gesture repeatedly performed, by recognizing the first motion gesture through whether the first FOV 411 is less than or equal to the first critical FOV 410 and is greater than or equal to the second FOV 420. For example, when a user repeats a swipe left gesture two or more times, an electronic device of the related art recognizes a swipe right gesture between the swipe left gestures. However, the electronic device 100 of the disclosure may not recognize the swipe right gesture even if the user moves the object to the right again after performing the swipe left gesture once by moving the object from the right to the left. For example, when recognizing an object that is less than or equal to a first critical field of view (FOV) (e.g., 45 degrees) to the left and is greater than or equal to a second critical field of view (FOV) (e.g., 60 degrees) to the right, the processor 220 may recognize the swipe right gesture, but when the swipe left gesture is performed repeatedly, the processor 220 may recognize an object that is greater than or equal to the second critical FOV (e.g., 60 degrees) to the left and is less than or equal to the first critical FOV (e.g., 45 degrees) to the right. Accordingly, even if the user repeats the swipe left gesture two or more times, the processor 220 may not recognize the swipe right gesture between the swipe left gestures. For convenience of description, the left or the right has been described, but a description of the accuracy of dynamic gesture recognition may be applied to other swipe gestures in addition to the swipe left gesture.

According to an embodiment of the disclosure, in response to an object that satisfies a specified condition being recognized in a first number of consecutive image frames among image frames acquired from the camera 210, the processor 220 may also determine, as the first FOV 411, the FOV between the first axis 400 and the first direction 401 in a first image frame following the first number of image frames. When the processor 220 begins to recognize a first motion gesture in response to recognizing an object that does not move or moves negligibly a little in the first number of image frames, the accuracy of recognizing the first motion gesture that is repeatedly performed may be further increased. For example, because the processor 220 may recognize a swipe right gesture when the object does not move on the left for a specified time or moves negligibly a little and then moves to the right, the processor 220 may not recognize the swipe right gesture when the swipe left gesture is performed repeatedly.

According to an embodiment of the disclosure, the accuracy of recognizing a motion gesture in the electronic device 100 may increase. The electronic device 100 may not recognize a motion gesture unintended by the user among specific motion gestures (e.g., a first motion gesture) that are repeatedly performed. For example, when the user repeatedly performs a swipe left gesture, the electronic device 100 may not recognize a swipe right gesture between the swipe left gestures. Accordingly, when the user wishes to execute a specific function (e.g., a first function) through a motion gesture (e.g., a first motion gesture), the usability of the electronic device 100 may increase.

With regard to FIG. 4, a description has been made based on the swipe left gesture, but the description of the swipe left gesture may also be applied to the swipe right gesture.

Figure 5:
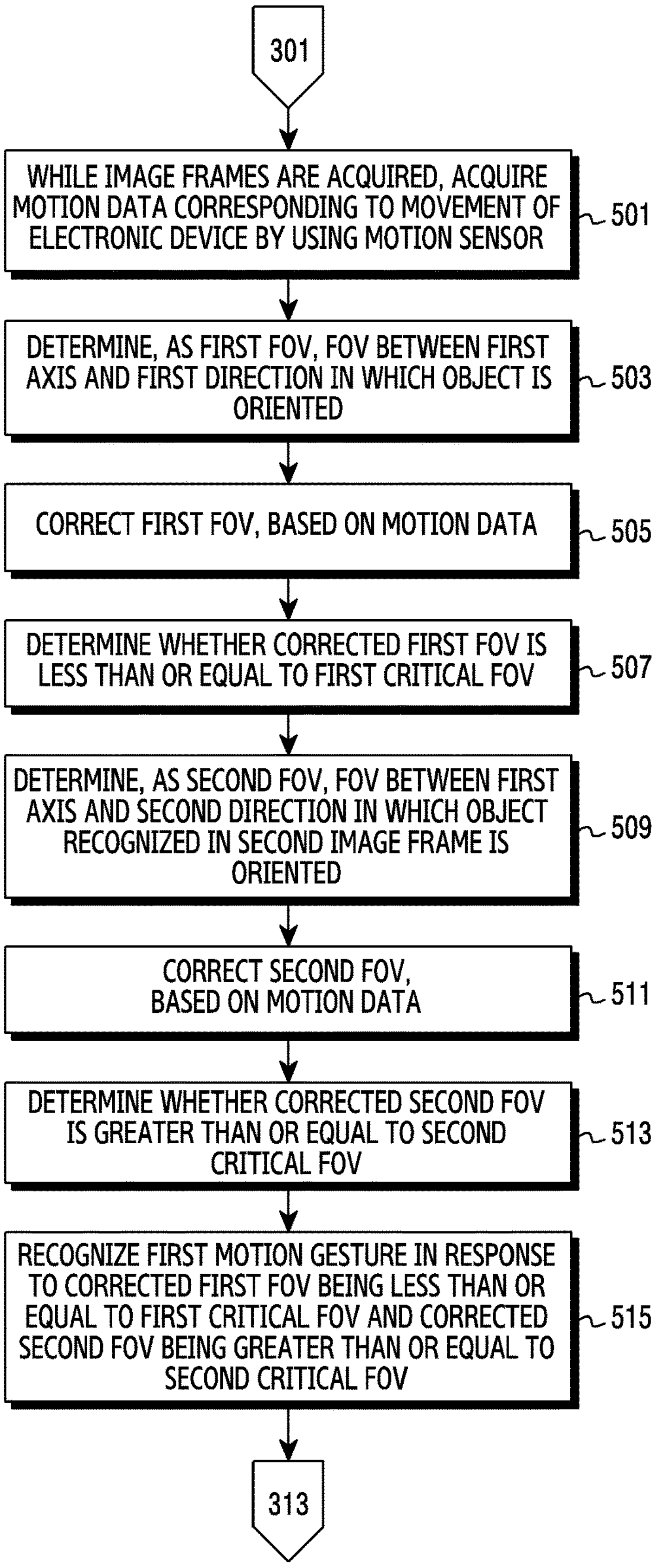
FIG. 5 is a flowchart illustrating an operation of detecting a first motion gesture based on motion data in an electronic device according to an embodiment of the disclosure.

FIG. 5 is a flowchart illustrating an operation of detecting a first motion gesture based on motion data in the electronic device 100 according to an embodiment of the disclosure. Operations described in FIG. 5 may be performed by the electronic device 100 of FIG. 1 or the processor 220 of FIG. 2.

Referring to FIG. 5, according to an embodiment of the disclosure, the processor 220 may perform operations shown in FIG. 5 after performing operation 301 of FIG. 3. The processor 220 may acquire image frames including a first image frame and a second image frame by using the camera 210, and may perform operations 501 to 515 of FIG. 5, based on the image frames.

According to an embodiment of the disclosure, in operation 501, while the image frames are acquired, the processor 220 may acquire motion data corresponding to the movement of the electronic device 100 by using the motion sensor 230. For example, the processor 220 may acquire the motion data including information about a field of view (FOV) by which the electronic device 100 rotates in a yaw direction by using the motion sensor 230. For another example, the processor 220 may acquire the motion data including information about a field of view (FOV) by which the electronic device 100 rotates in any one of a yaw direction, a pitch direction, or a roll direction by using the motion sensor 230. For further example, the motion data may include information about a field of view (FOV) by which the electronic device 100 rotates about any one of the x-axis, y-axis, or z-axis of FIG. 1. The motion data may also include information about a field of view (FOV) by which the electronic device 100 rotates about an arbitrary axis (e.g., a virtual axis set in an x-y-z space). The motion data may also include information about a field of view (FOV) by which the electronic device 100 rotates around an axis (e.g., a y-axis) perpendicular to a first axis (e.g., the first axis 400 in FIG. 4), a first direction (e.g., the first direction 401 in FIG. 4), and a second direction (e.g., the second direction 402 in FIG. 4).

According to an embodiment of the disclosure, while the image frames are acquired, the processor 220 may acquire motion data corresponding to the movement of a second object extending from a first object related to motion, based on the image frames. While the image frames are acquired, the processor 220 may acquire first motion data corresponding to the movement of the electronic device 100 and second motion data corresponding to the movement of the second object, based on the image frames, by using the motion sensor 230. For example, when the first object related to motion is a user's hand, the processor 220 may acquire second motion data corresponding to the movement of the second object that is the user's body, through image analysis. The processor 220 may analyze the image frames to acquire second motion data including information about a field of view (FOV) by which the user's body (e.g., torso, face, and arm) rotates. For example, while the image frames are acquired, the processor 220 may analyze the image frames to acquire second motion data including information about a field of view (FOV) by which the user's body rotates about an arbitrary axis. The arbitrary axis may be a virtual axis set in an x-y-z space, or an axis (e.g., a y-axis) corresponding to a vertical direction of the electronic device 100. While the image frames are acquired, the processor 220 may acquire second motion data including information about a field of view (FOV) by which the user's body rotates in a yaw direction.

According to an embodiment of the disclosure, in operation 503, the processor 220 may determine, as a first field of view (FOV), the FOV between a first axis and a first direction in which an object related to motion is oriented in a first image frame. The first axis may correspond to the first axis described in FIG. 3. Operation 503 may correspond to operation 303 of FIG. 3.

According to an embodiment of the disclosure, in operation 505, the processor 220 may correct the first FOV, based on the motion data.

According to an embodiment of the disclosure, the processor 220 may correct the first FOV, based on the motion data acquired using the motion sensor 230 while the image frames are acquired. The processor 220 may compensate for the first FOV by a field of view (FOV) by which the electronic device 100 rotates. The processor 220 may correct the first FOV by a field of view (FOV) by which the electronic device 100 rotates in a yaw direction while the image frames are acquired.

According to an embodiment of the disclosure, the processor 220 may correct the first FOV, based on the motion data (e.g., second motion data) corresponding to the movement of the second object extending from the first object, which is acquired based on the image frames while the image frames are acquired. The processor 220 may compensate for the first FOV by a field of view (FOV) by which the second object rotates in the yaw direction while the image frames are acquired.

According to an embodiment of the disclosure, the processor 220 may acquire motion data corresponding to the movement of the electronic device 100 between an arbitrary time point and a time point at which a first image frame is acquired. For example, the arbitrary time point may be a time point at which the processor 220 determines that a direction in which the camera 210 is oriented and a front direction in which a user looks at are parallel to each other. In operation 505, the processor 220 may correct the first FOV, based on motion data including information about a field of view (FOV) by which the electronic device 100 moves till a time point at which the first image frame is acquired.

According to an embodiment of the disclosure, in operation 507, the processor 220 may determine whether the corrected first FOV is less than or equal to a first critical field of view (FOV).

According to an embodiment of the disclosure, in response to determining that the corrected first FOV is less than or equal to the first critical FOV in operation 507, the processor 220 may perform operation 509. According to another embodiment of the disclosure, the processor 220 may also perform operation 509 regardless of whether the corrected first FOV is less than or equal to the first critical FOV in operation 507.

According to an embodiment of the disclosure, in operation 509, the processor 220 may determine, as a second field of view (FOV), the FOV between the first axis and a second direction in which an object recognized in the second image frame is oriented. Operation 509 may correspond to operation 307 of FIG. 3.

According to an embodiment of the disclosure, in operation 511, the processor 220 may correct the second FOV, based on the motion data.

According to an embodiment of the disclosure, the processor 220 may correct the second FOV, based on the motion data acquired using the motion sensor 230 while the image frames are acquired. The processor 220 may compensate for the second FOV by a field of view (FOV) by which the electronic device 100 rotates. The processor 220 may correct the second FOV by a field of view (FOV) by which the electronic device 100 rotates in a yaw direction while the image frames are acquired.

According to an embodiment of the disclosure, the processor 220 may correct the second FOV, based on the motion data (e.g., second motion data) corresponding to the movement of the second object extending from the first object, which is acquired based on the image frames while the image frames are acquired. The processor 220 may compensate for the second FOV by a field of view (FOV) by which the second object rotates in the yaw direction while the image frames are acquired.

According to an embodiment of the disclosure, the processor 220 may acquire motion data corresponding to the movement of the electronic device 100 between an arbitrary time point and a time point at which the second image frame is acquired. For example, the arbitrary time point may coincide with the arbitrary time point described in operation 505. In operation 511, the processor 220 may correct the second FOV, based on motion data including information about a field of view (FOV) by which the electronic device 100 moves till the time point at which the second image frame is acquired.

According to an embodiment of the disclosure, in operation 513, the processor 220 may determine whether the corrected second FOV is less than or equal to a second critical field of view (FOV).

According to an embodiment of the disclosure, in operation 515, the processor 220 may recognize a first motion gesture, in response to the corrected first FOV being less than or equal to the first critical FOV, and the corrected second FOV being greater than or equal to the second critical FOV. In an embodiment of the disclosure, the processor 220 may recognize the first motion gesture, in response to determining that the corrected first FOV is less than or equal to the first critical FOV, the corrected second FOV is less than or equal to the second critical FOV, and the first direction and the second direction are oriented in different directions. In another embodiment of the disclosure, when it is determined that the FOV between the first axis and a second direction in which an object recognized across the first axis in the second image frame is oriented is the second FOV in relation to operation 509, the processor 220 may also recognize the first motion gesture, in response to the corrected first FOV being less than or equal to the first critical FOV, and the corrected second FOV being less than or equal to the second critical FOV.

According to an embodiment of the disclosure, the processor 220 may perform operation 313 of FIG. 3 after performing operation 515. In response to recognizing the first motion gesture in operation 515, the processor 220 may perform a first function corresponding to the first motion gesture.

According to an embodiment of the disclosure, the processor 220 may compensate for the movement of the electronic device 100 that occurs while the image frames are acquired, through operations shown in FIG. 5. In addition, even when the user's body moves while the image frames are acquired, the processor 220 compensates for a field of view (FOV) of the user's hand, whereby the accuracy of recognizing a motion gesture may be improved.

Figure 6:
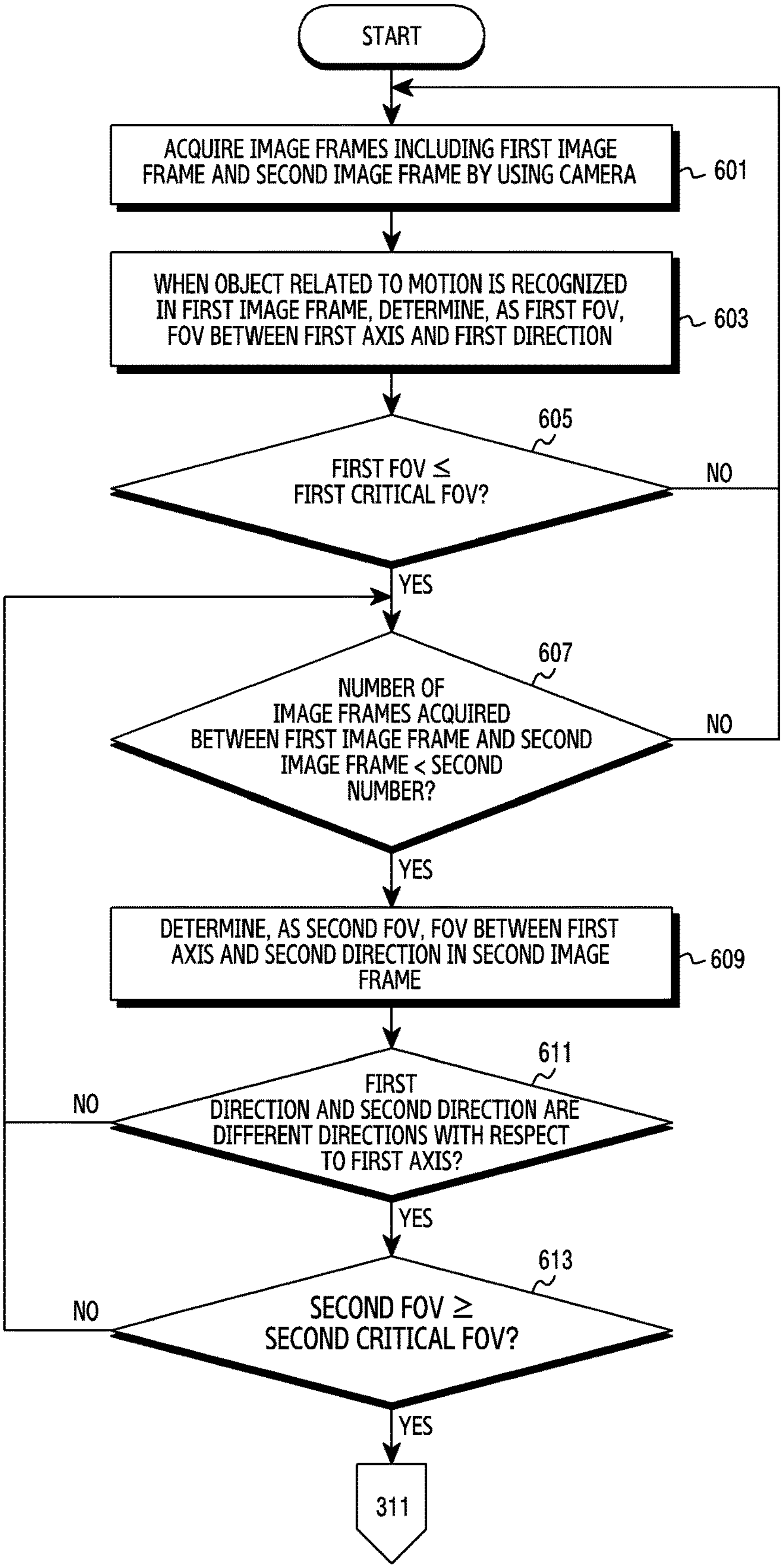
FIG. 6 is a flowchart illustrating an operation of detecting a first motion gesture in an electronic device according to an embodiment of the disclosure.

FIG. 6 is a flowchart illustrating an operation of detecting a first motion gesture in an electronic device according to an embodiment of the disclosure. Operations described in FIG. 6 may be performed by the electronic device 100 of FIG. 1 or the processor 220 of FIG. 2.

Referring to FIG. 6, according to an embodiment of the disclosure, before performing operation 601, the processor 220 may initialize a variable used to recognize a motion gesture. For example, the processor 220 may set a flag related to motion gesture recognition to an OFF state, and may set a counter related to motion gesture recognition to 0.

According to an embodiment of the disclosure, in operation 601, the processor 220 may acquire image frames including a first image frame and a second image frame by using the camera 210. Operation 601 may correspond to operation 301 of FIG. 3.

According to an embodiment of the disclosure, in operation 603, when an object related to motion is recognized in a first image frame, the processor 220 may determine, as a first field of view (FOV), the FOV between a first axis and a first direction in which the object is oriented. Operation 603 may correspond to operation 303 of FIG. 3.

According to an embodiment of the disclosure, operation 603 includes the operations of recognizing the object related to motion in the first image frame, determining a flag related to a motion gesture, and setting, as the first FOV, the FOV between the first axis and the first direction in which the object is oriented. For example, the processor 220 may determine that the object is recognized in the first image frame among image frames acquired from the camera 210. In addition, when the object is recognized in the first image frame, the processor 220 may determine whether the flag related to the motion gesture is in an ON state. In response to a flag related to a dynamic gesture being in an OFF state, the processor 220 may determine the FOV between the first axis and the first direction, as the first FOV. In an embodiment of the disclosure, in response to the flag being in the OFF state, the processor 220 may also determine whether the object satisfying a specified condition is recognized in a first number of consecutive image frames among the image frames and, in response to the object that satisfies the condition being recognized in the first number of consecutive image frames, the processor 220 may determine the first FOV in a first image frame following the first number of image frames.

According to an embodiment of the disclosure, in operation 605, the processor 220 may determine whether the first FOV is less than or equal to a first critical field of view (FOV).

According to an embodiment of the disclosure, the processor 220 may perform operation 607 in response to determining that the first FOV is less than or equal to the first critical FOV in operation 605. In an embodiment of the disclosure, in response to determining that the first FOV is less than or equal to the first critical FOV, the processor 220 may convert the flag related to the motion gesture to an ON state and set the counter related to the motion gesture to 1. That the flag is in the ON state may mean that a first motion gesture is begun to be recognized. In response to determining that the first FOV is less than or equal to the first critical FOV, the processor 220 may display a user interface (UI) related to a motion gesture on the display 110. The UI may include information that the first motion gesture is begun to be recognized.

According to an embodiment of the disclosure, in response to determining that the first FOV exceeds the first critical FOV in operation 605, the processor 220 may perform operation 601. For example, in response to determining that the first FOV exceeds the first critical FOV, the processor 220 may maintain the flag related to the motion gesture in the OFF state and maintain the counter related to the motion gesture as 0. When the first FOV exceeds the first critical FOV, because the first motion gesture is not begun, the processor 220 may determine the first FOV while continuing to acquire image frames.

According to an embodiment of the disclosure, in operation 607, in response to determining that the first FOV is less than or equal to the first critical FOV, the processor 220 may determine whether the number of image frames acquired between the first image frame and the second image frame is less than a second number. The second number may be a constant stored in the electronic device 100 or a constant changeable depending on the user's settings or shooting environment.

According to an embodiment of the disclosure, operation 607 may include the operations of acquiring the image frames from the camera 210, recognizing an object related to motion in the second image frame, determining the flag related to the dynamic gesture, and determining whether the number of image frames acquired between the first image frame and the second image frame is less than the second number. For example, the processor 220 may acquire image frames following the first image frame from the camera 210, and may recognize the object in the image frames following the first image frame. When the object is recognized in the second image frame, the processor 220 may determine whether the flag is in an ON state. In response to the flag being ON, the processor 220 may determine the number of image frames acquired between the first image frame and the second image frame. When the flag is ON, because the first motion gesture is begun to be recognized, the processor 220 may determine the number of image frames acquired between the first image frame and the second image frame.

According to an embodiment of the disclosure, the processor 220 may perform operation 607 in order to end the recognition of the first motion gesture within a specified time interval after beginning to recognize the first motion gesture in the first image frame. The specified time interval may correspond to the second number of image frames. For example, when the specified time interval is 2 seconds and a frame rate for acquiring the image frame is 30 frames per second (fps), the processor 220 may determine whether the number of image frames acquired between the first image frame and the second image frame is less than 60.

According to an embodiment of the disclosure, the processor 220 may also determine the number of image frames acquired between the first image frame and the second image frame, through the counter related to the motion gesture. For example, when the counter is 15, the processor 220 may determine that the number of image frames acquired between the first image frame and the second image frame is 14.

According to an embodiment of the disclosure, in response to the number of image frames acquired between the first image frame and the second image frame being less than the second number in operation 607, the processor 220 may perform operation 609. In response to the number of image frames acquired between the first image frame and the second image frame being less than the second number, the processor 220 may also add 1 to the counter related to the motion gesture, and perform operation 609.

According to an embodiment of the disclosure, in response to the number of image frames acquired between the first image frame and the second image frame being greater than or equal to the second number in operation 607, the processor 220 may perform operation 601. For example, in response to the number of image frames acquired between the first image frame and the second image frame being greater than or equal to the second number, the processor 220 may turn OFF the flag related to the motion gesture and may set the counter related to the motion gesture to 0.

According to an embodiment of the disclosure, in operation 609, in response to the number of image frames acquired between the first image frame and the second image frame being less than the second number, the processor 220 may determine, as a second field of view (FOV), the FOV between a first axis and a second direction in which the object is oriented in the second image frame.

According to an embodiment of the disclosure, in operation 611, the processor 220 may determine whether the first direction and the second direction are oriented in different directions with respect to the first axis.

According to an embodiment of the disclosure, in response to determining in operation 611 that the first direction and the second direction are oriented in different directions, the processor 220 may perform operation 613.

According to an embodiment of the disclosure, in response to determining in operation 611 that the first direction and the second direction are not oriented in different directions with respect to the first axis, the processor 220 may perform operation 607. For example, in response to determining that the first direction and the second direction are the same direction with respect to the first axis, the processor 220 may repeat operations 607 to 611 until it is determined that the flag related to the motion gesture is maintained in the ON state while the first direction and the second direction are oriented in different directions.

According to an embodiment of the disclosure, in operation 613, in response to determining that the first direction and the second direction are oriented in different directions with respect to the first axis, the processor 220 may determine whether the second FOV is greater than or equal to a second critical field of view (FOV).

According to an embodiment of the disclosure, in response to determining that the second FOV is greater than or equal to the second critical FOV in operation 613, the processor 220 may perform operation 311 of FIG. 3. For example, in response to determining that the second FOV is greater than or equal to the second critical FOV, the processor 220 may recognize the first motion gesture. When the processor 220 detects the first motion gesture, the processor 220 may perform a first function corresponding to the first motion gesture.

According to an embodiment of the disclosure, in response to determining that the second FOV is less than the second critical FOV in operation 613, the processor 220 may perform operation 607. The processor 220 may repeat operations 607 to 613 while acquiring image frames until it is determined that the second FOV is greater than or equal to the second critical FOV.

According to an embodiment of the disclosure, the reliability of recognizing a motion gesture may increase through operations shown in FIG. 6. For example, when the number of image frames acquired between the first image frame and the second image frame is not considered as in operation 607 of FIG. 6, the electronic device of the related art recognizes a motion gesture unintended by a user, because recognizing an object having a first field of view (FOV) less than or equal to a first critical field of view (FOV) at an arbitrary first time point, and recognizing an object having a second field of view (FOV) greater than or equal to a second critical field of view (FOV) at an arbitrary second time point. The electronic device 100 of the disclosure may not recognize the motion gesture unintended by the user, because ending the recognition of the second motion gesture within a specified time (or a specified number of image frames) after beginning to recognize the first motion gesture. Therefore, the reliability of recognizing the motion gesture in the electronic device may increase.

Figure 7:
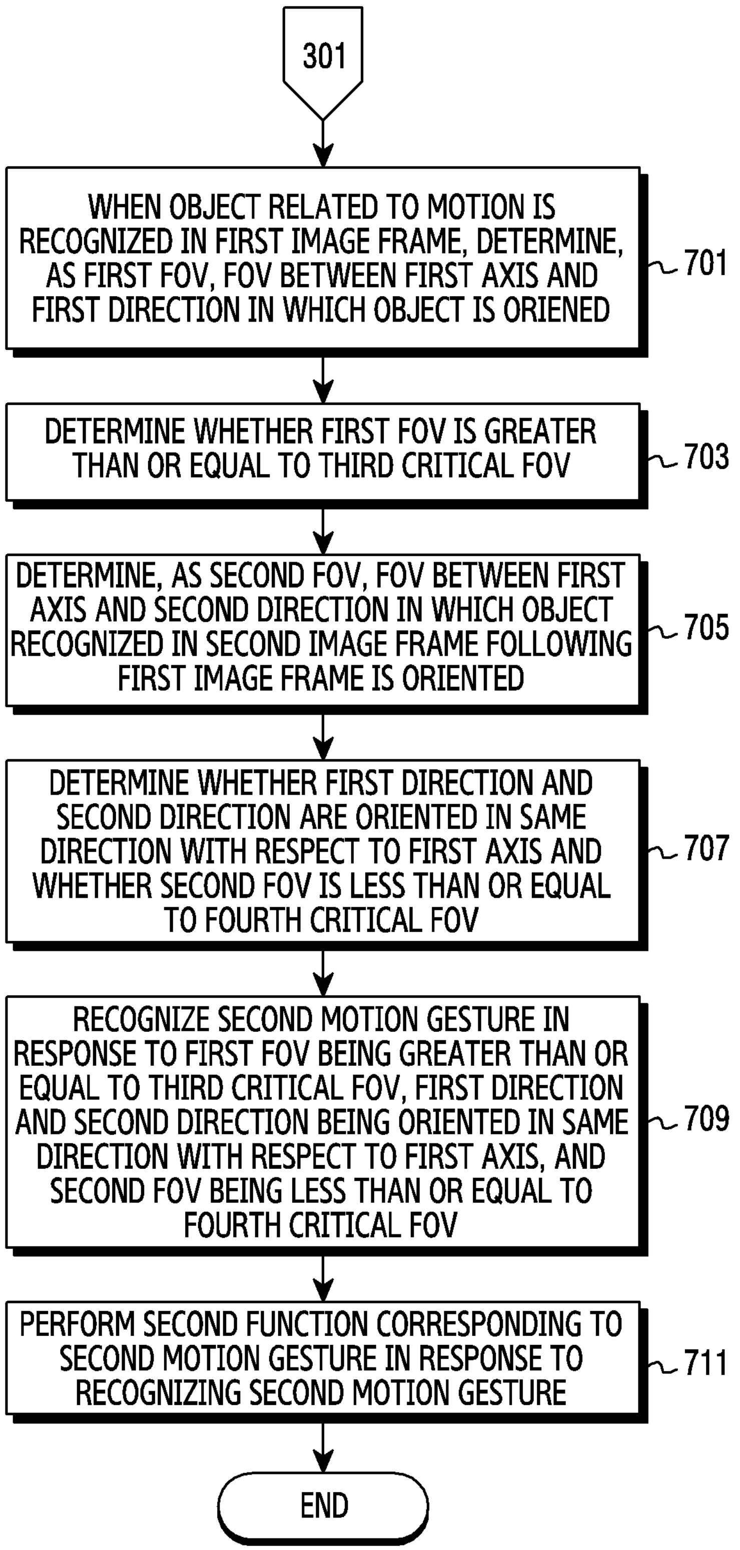
FIG. 7 is a flowchart illustrating an operation of detecting a second motion gesture in an electronic device according to an embodiment of the disclosure.

FIG. 7 is a flowchart illustrating an operation of detecting a second motion gesture in an electronic device according to an embodiment of the disclosure. Operations described in FIG. 7 may be performed by the electronic device 100 of FIG. 1 or the processor 220 of FIG. 2.

Referring to FIG. 7, according to an embodiment of the disclosure, the processor 220 may perform operation 301 of FIG. 3 before performing operation 701. The processor 220 may acquire image frames by using the camera 210, and perform operations 701 to 711 of FIG. 7, based on the image frames.

According to an embodiment of the disclosure, in operation 701, when an object related to motion is recognized in a first image frame, the processor 220 may determine, as a first field of view (FOV), the FOV between a first axis and a first direction in which the object is oriented. Operation 701 may correspond to operation 303 of FIG. 3.

According to an embodiment of the disclosure, in operation 703, the processor 220 may determine whether the first FOV is greater than or equal to a third critical field of view (FOV). Regarding the third critical FOV, a description will be made later with reference to FIG. 8.

According to an embodiment of the disclosure, in operation 705, the processor 220 may determine, as a second field of view (FOV), the FOV between the first axis and a second direction in which the object recognized in a second image frame following the first image frame is oriented. Operation 705 may correspond to operation 307 of FIG. 3.

According to an embodiment of the disclosure, in operation 707, the processor 220 may determine whether the first direction and the second direction are oriented in the same direction with respect to the first axis and whether the second FOV is less than or equal to a fourth critical field of view (FOV). Regarding the same direction based on the first axis and the fourth critical FOV, a description will be made later with reference to FIG. 8.

According to an embodiment of the disclosure, in operation 709, the processor 220 may recognize a second motion gesture, in response to the first FOV being greater than or equal to the third critical FOV, the first direction and the second direction being oriented in the same direction with respect to the first axis, and the second FOV being less than or equal to the fourth critical FOV. In an embodiment of the disclosure, the second motion gesture may include a tap gesture.

According to an embodiment of the disclosure, in operation 711, in response to recognizing the second motion gesture, the processor 220 may perform a second function corresponding to the second motion gesture. For example, when the processor 220 recognizes the second motion gesture while executing a camera application, the processor 220 may determine that a user input of selecting a specific item among several items has been received. For another example, when the processor 220 recognizes the second motion gesture while executing the camera application, the processor 220 may begin shooting in a currently selected shooting mode. In addition to this, various embodiments that may be performed by those skilled in the art are possible.

Figure 8:
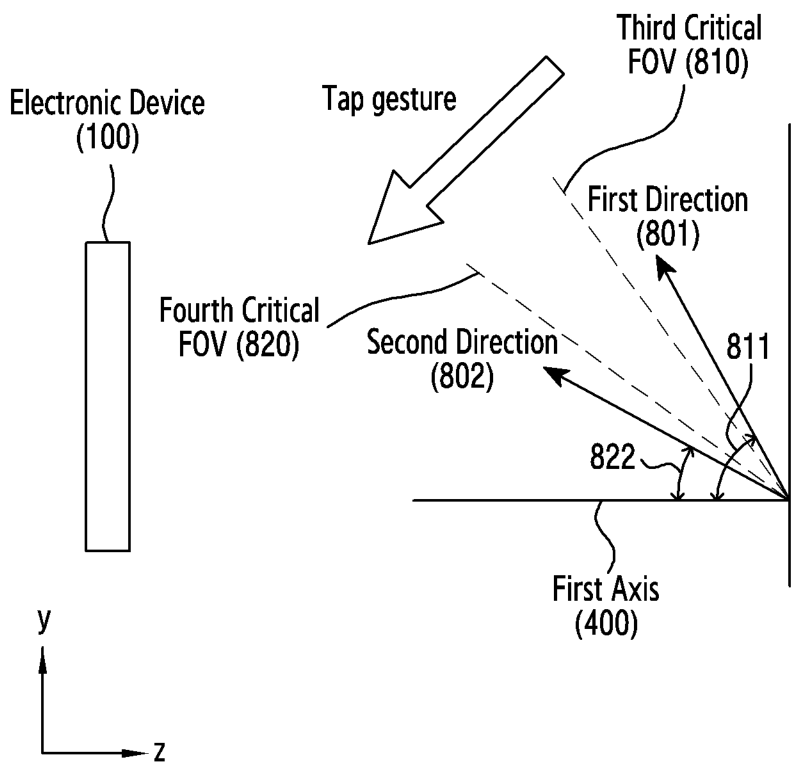
FIG. 8 illustrates an example of a second motion gesture that may be recognized by an electronic device according to an embodiment of the disclosure.

FIG. 8 illustrates a second motion gesture that may be recognized by an electronic device according to an embodiment of the disclosure.

Referring to FIG. 8, according to an embodiment of the disclosure, the second motion gesture may include a tap gesture. FIG. 8 may be understood as being drawn on a y-z plane. For example, in FIG. 8, a +z direction may be a direction in which the front camera 131 is oriented, and a +y direction may be a vertical direction of the electronic device 100.

According to an embodiment of the disclosure, the first axis 400 may correspond to a direction in which the camera 210 is oriented. For example, in FIG. 8, it is illustrated based on that a user is located in the direction (e.g., the +z direction) in which the front camera 131 of the electronic device 100 is oriented, but embodiments of the disclosure may also be applied to a −z direction in which the rear camera 132 is oriented. However, in FIG. 4, for convenience of description, a description is made based on that the user is located in the direction (e.g., the +z direction) in which the front camera 131 is oriented.

According to an embodiment of the disclosure, the processor 220 may acquire image frames through the camera 210 (e.g., the front camera 131), and when an object related to motion is recognized in a first image frame, may determine, as a first field of view (FOV) 811, the FOV between a first axis 400 and a first direction 801 in which the object is oriented. When the object is a user's hand, the first direction 801 may be understood as a direction of going from the user's wrist to the fingertips. The first direction 801 of FIG. 8 may be distinguished from the first direction 401 shown in FIG. 4.

In an embodiment of the disclosure, the processor 220 may determine the first direction 801 through image analysis of the first image frame. The processor 220 may determine, as the first FOV 811, a field of view (FOV) by which the first direction 801 is inclined with respect to the first axis 400. For example, the processor 220 may determine, as the first FOV 811, the FOV between the first direction 801 and a direction (e.g., the −z direction) opposite to a direction (e.g., the +z direction) in which the camera 210 (e.g., the front camera 131) is oriented.

According to an embodiment of the disclosure, the processor 220 may determine whether the first FOV 811 is greater than or equal to a third critical field of view (FOV) 810. For example, the third critical FOV 810 may be 60 degrees. For another example, the third critical FOV 810 may be set to have 70 degrees, 80 degrees, or other various values.

According to an embodiment of the disclosure, the processor 220 may determine, as a second field of view (FOV) 822, the FOV between the first axis 400 and a second direction 802 in which the object recognized in a second image frame following the first image frame is oriented. When the object is the user's hand, the second direction 802 may be understood as a direction of going from the user's wrist to the fingertips. The processor 220 may determine the second direction 802 through image analysis of the second image frame. The processor 220 may determine, as the second FOV 822, a field of view (FOV) by which the second direction 802 is inclined with respect to the first axis 400. For example, the processor 220 may determine, as the second FOV 822, the FOV between the second direction 802 and the direction (e.g., the −z direction) opposite to the direction (e.g., the +z direction) in which the camera 210 (e.g., the front camera 131) is oriented.

According to an embodiment of the disclosure, the processor 220 may determine whether the second FOV 822 is less than or equal to a fourth critical field of view (FOV) 820. In an embodiment of the disclosure, the fourth critical FOV 820 may have a smaller value than the third critical FOV 810. For example, the fourth critical FOV 820 may be 40 degrees. For another example, the fourth critical FOV 820 may have various values set to be smaller than the first critical FOV 810.

According to an embodiment of the disclosure, the processor 220 may determine whether the first direction 801 and the second direction 802 are oriented in the same direction with respect to the first axis 400. For example, referring to FIG. 8, the same direction with respect to the first axis 400 may mean that the first direction 801 and the second direction 802 are the +y direction around the z-axis. For example, that the first direction 801 and the second direction 802 are oriented in the same direction with respect to the first axis 400 may mean that the first direction 801 and the second direction 802 are directed to the same area when any plane (e.g., a y-z plane in FIG. 8) is divided into two areas with respect to the first axis 400 (e.g., the z-axis). For another example, that the first direction 801 and the second direction 802 are oriented in the same direction with respect to the first axis 400 may also mean that the first direction 801 is a direction of rotating by the first FOV 811 clockwise with respect to the first axis 400 around an x-axis, and the second direction 802 is a direction of rotating by the second FOV 822 clockwise with respect to the first axis 400 around the x-axis. For example, the first direction 801 may be a direction of rotating the direction (e.g., the −z direction) opposite to the direction (e.g., the +z direction) in which the camera 210 (e.g., the front camera 131) is oriented, by the first FOV 811 clockwise around the x-axis, and the second direction 802 may be a direction of rotating the direction (e.g., the −z direction) opposite to the direction in which the camera 210 is oriented, by the second FOV 822 clockwise around the x-axis. Accordingly, the first FOV 811 and the second FOV 822 may mean FOVs of rotating in a pitch direction with respect to the electronic device 100.

According to an embodiment of the disclosure, the processor 220 may also recognize a first surface of the object oriented in the first direction 801 in the first image frame, and recognize the first surface of the object oriented in the second direction 802 in the second image frame. For example, the processor 220 may recognize the user's palm as the object in the first image frame, and recognize the user's palm as the object even in the second image frame. According to an embodiment of the disclosure, when the processor 220 recognizes the same surface of the object in the first image frame and the second image frame, the processor 220 may determine that the first direction 801 and the second direction 802 are oriented in the same direction with respect to the first axis 400.

According to an embodiment of the disclosure, the processor 220 may determine the first direction 801, the first FOV 811, the second direction 802, and the second FOV 822 on an arbitrary plane. For example, an object (e.g., a user's hand) related to motion may move in three dimensions in real space, but the processor 220 may determine a direction in which the object is oriented in two dimensions. For example, referring to FIG. 8, the processor 220 may determine the first direction 801, the first FOV 811, the second direction 802, and the second FOV 822 in a plane perpendicular to the front of the electronic device 100 and parallel to a vertical direction (e.g., y-axis) of the electronic device 100. The plane perpendicular to the front of the electronic device 100 and parallel to the vertical direction of the electronic device 100 may be the z-y plane.

According to an embodiment of the disclosure, in response to the object that satisfies a specified condition being recognized in a first number of consecutive image frames among image frames acquired from the camera 210, the processor 220 may also determine, as the first FOV 811, the FOV between the first axis 400 and the first direction 801 in a first image frame following the first number of image frames. When the processor 220 begins to recognize a second motion gesture in response to recognizing an object that does not move or moves negligibly a little in the first number of image frames, the accuracy of recognizing the second motion gesture repeatedly performed may be increased.

An electronic device of an embodiment may include a camera, and at least one processor electrically connected to the camera. The at least one processor may acquire image frames including a first image frame and a second image frame by using the camera, and when an object related to motion is recognized in the first image frame, determine, as a first field of view (FOV), the FOV between a first axis and a first direction in which the object is oriented, and determine whether the first FOV is less than or equal to a first critical field of view (FOV), and determine, as a second field of view (FOV), the FOV between the first axis and a second direction in which the object recognized in the second image frame following the first image frame is oriented, and determine whether the first direction and the second direction are oriented in different directions with respect to the first axis and whether the second FOV is greater than or equal to a second critical field of view (FOV), and recognize a first motion gesture, in response to the first FOV being less than or equal to the first critical FOV, the first direction and the second direction being oriented in different directions with respect to the first axis, and the second FOV being greater than or equal to the second critical FOV, and perform a first function corresponding to the first motion gesture in response to recognizing the first motion gesture.

In the electronic device of an embodiment of the disclosure, the object may be a user's hand.

In the electronic device of an embodiment of the disclosure, the first critical FOV may have a smaller value than the second critical FOV.

In the electronic device of an embodiment of the disclosure, the at least one processor may acquire the image frames from the camera, and in response to the object that satisfies a specified condition being recognized in a first number of consecutive image frames among the image frames, determine, as the first FOV, the FOV between the first axis and the first direction in the first image frame following the first number of image frames.

In the electronic device of an embodiment of the disclosure, the first axis may correspond to a direction in which the camera is oriented.

The electronic device of an embodiment of the disclosure may further include a motion sensor electrically connected to the at least one processor, and the at least one processor may, while the image frames are acquired, acquire motion data corresponding to the movement of the electronic device by using the motion sensor, correct the first FOV and the second FOV, based on the motion data, and recognize the first motion gesture, in response to the corrected first FOV being less than or equal to the first critical FOV and the corrected second FOV being greater than or equal to the second critical FOV.

In the electronic device of an embodiment of the disclosure, the at least one processor may, when the object is recognized in the first image frame, determine the FOV between the first axis and the first direction as the first FOV, and in response to the first FOV being less than or equal to the first critical FOV, determine whether the number of image frames acquired between the first image frame and the second image frame is less than a second number, and in response to the number of image frames being less than the second number, determine, as the second FOV, the FOV between the second direction and the first axis in the second image frame, and in response to the second FOV being greater than or equal to the second critical FOV, recognize the first motion gesture.

In the electronic device of an embodiment of the disclosure, the first motion gesture may include a swipe gesture.

In the electronic device of an embodiment of the disclosure, the at least one processor may determine whether the first FOV is greater than or equal to a third critical FOV, and determine whether the first direction and the second direction are oriented in the same direction with respect to the first axis and whether the second FOV is less than or equal to a fourth critical field of view (FOV), and recognize a second motion gesture, in response to the first FOV being greater than or equal to the third critical FOV, the first direction and the second direction being oriented in the same direction with respect to the first axis, and the second FOV being less than or equal to the fourth critical FOV, and in response to recognizing the second motion gesture, perform a second function corresponding to the second motion gesture.

In the electronic device of an embodiment of the disclosure, the second motion gesture may include a tap gesture.

A method of operating an electronic device of an embodiment may include acquiring image frames including a first image frame and a second image frame by using a camera included in the electronic device, and when an object related to motion is recognized in the first image frame, determining, as a first field of view (FOV), the FOV between a first axis and a first direction in which the object is oriented, and determining whether the first FOV is less than or equal to a first critical field of view (FOV), and determining, as a second field of view (FOV), the FOV between the first axis and a second direction in which the object recognized in the second image frame following the first image frame is oriented, and determining whether the first direction and the second direction are oriented in different directions with respect to the first axis and whether the second FOV is greater than or equal to a second critical field of view (FOV), and recognizing a first motion gesture, in response to the first FOV being less than or equal to the first critical FOV, the first direction and the second direction being oriented in different directions with respect to the first axis, and the second FOV being greater than or equal to the second critical FOV, and performing a first function corresponding to the first motion gesture in response to recognizing the first motion gesture.

In the method of operating the electronic device of an embodiment of the disclosure, the operation of determining, as the first FOV, the FOV between the first axis and the first direction in the first image frame may include determining whether the object satisfying a specified condition is recognized in a first number of consecutive image frames among the image frames, and in response to the object that satisfies the specified condition being recognized in the first number of consecutive image frames, determining, as the first FOV, the FOV between the first axis and the first direction in the first image frame following the first number of image frames.

In the method of operating the electronic device of an embodiment of the disclosure, the operation of determining whether the first FOV is less than or equal to the first critical FOV may include the operations of, while the image frames are acquired, acquiring motion data corresponding to the movement of the electronic device by using a motion sensor included in the electronic device, correcting the first FOV, based on the motion data, and determining whether the corrected first FOV is less than or equal to the first critical FOV.

In the method of operating the electronic device of an embodiment of the disclosure, the operation of determining whether the second FOV is greater than or equal to the second critical FOV may include the operations of, while the image frames are acquired, acquiring motion data corresponding to the movement of the electronic device by using a motion sensor included in the electronic device, correcting the second FOV, based on the motion data, and determining whether the corrected second FOV is greater than or equal to the second critical FOV.

The method of operating the electronic device of an embodiment may include the operations of, when the object is recognized in the first image frame, determining the FOV between the first axis and the first direction as the first FOV, and in response to the first FOV being less than or equal to the first critical FOV, determining whether the number of image frames acquired between the first image frame and the second image frame is less than a second number, and in response to the number of image frames being less than the second number, determining, as the second FOV, the FOV between the first axis and the second direction in the second image frame, and in response to the second FOV being equal to or greater than the second critical FOV, recognizing the first motion gesture.

An electronic device of an embodiment may include a camera, and at least one processor electrically connected to the camera. The at least one processor may acquire image frames including a first image frame and a second image frame by using the camera, and when an object related to motion is recognized in the first image frame, determine, as a first field of view (FOV), the FOV between a first axis and a first direction in which the object is oriented, and determine whether the first FOV is less than or equal to a first critical field of view (FOV), and determine, as a second field of view (FOV), the FOV between the first axis and a second direction in which the object recognized cross the first axis in the second image frame following the first image frame is oriented, and determine whether the second FOV is greater than or equal to a second critical field of view (FOV), and recognize a first motion gesture, in response to the first FOV being less than or equal to the first critical FOV and the second FOV being greater than or equal to the second critical FOV, and perform a first function corresponding to the first motion gesture in response to recognizing the first motion gesture.

In the electronic device of an embodiment of the disclosure, the at least one processor may, in response to recognizing a first surface of the object in the first image frame and recognizing a second surface of the object in the second image frame, determine that the object crossing the first axis has been recognized in the second image frame.

In the electronic device of an embodiment of the disclosure, the at least one processor may determine the first direction, the first FOV, the second direction, and the second FOV on any one plane among planes perpendicular to the front of the electronic device.

The electronic device of an embodiment of the disclosure may further include a motion sensor electrically connected to the at least one processor, and the at least one processor may, while the image frames are acquired, acquire motion data corresponding to the movement of the electronic device by using the motion sensor, and correct the first FOV and the second FOV, based on the motion data, and recognize the first motion gesture, in response to the corrected first FOV being less than or equal to the first critical FOV and the corrected second FOV being greater than or equal to the second critical FOV.

In the electronic device of an embodiment of the disclosure, the motion data may include information about a field of view (FOV) by which the electronic device rotates around an axis perpendicular to the first axis, the first direction, and the second direction.

Figure 9:
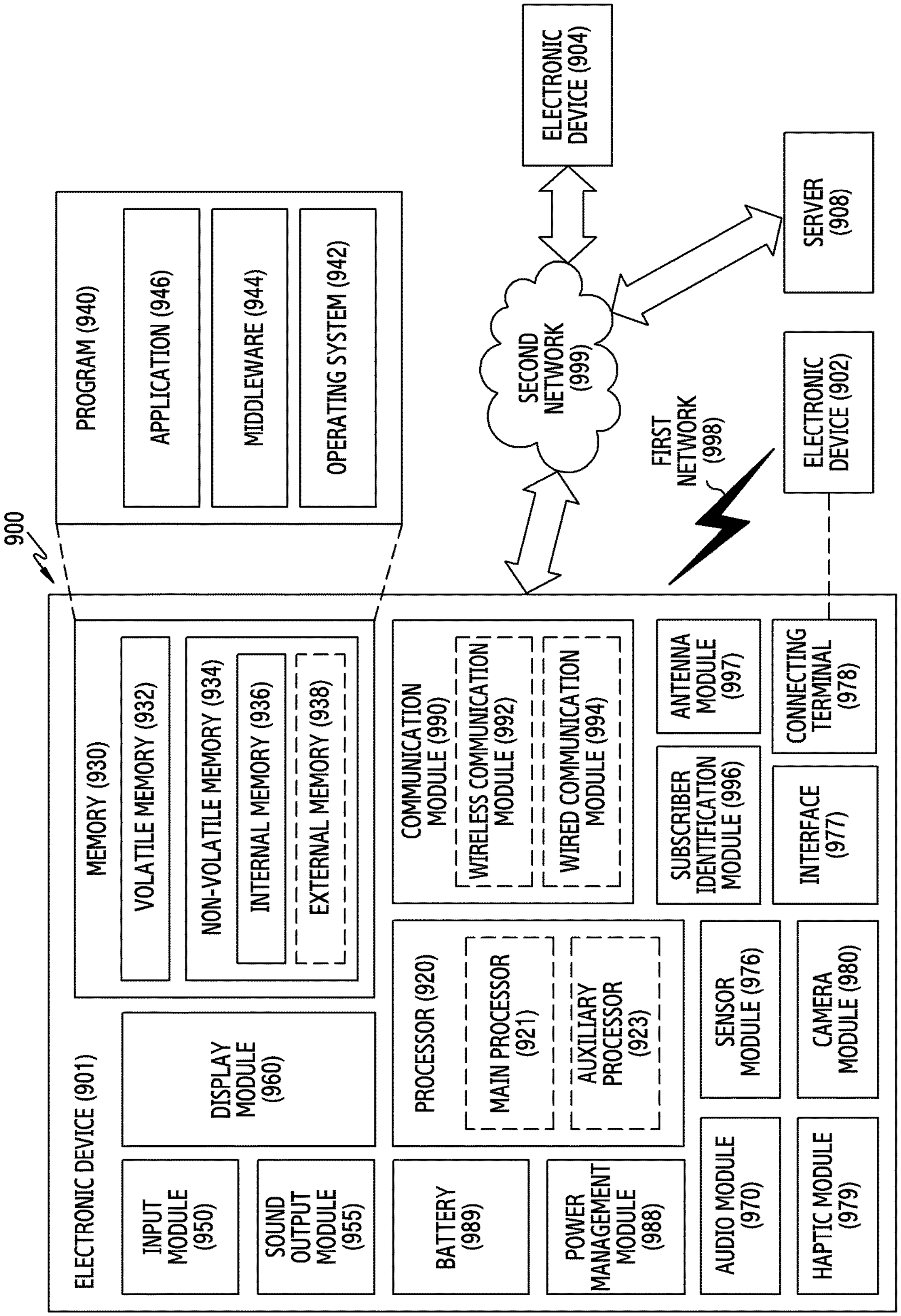
FIG. 9 is a block diagram of an electronic device in a network environment according to an embodiment of the disclosure.

FIG. 9 is a block diagram illustrating an electronic device in a network environment according to an embodiment of the disclosure.

Referring to FIG. 9, an electronic device 901 in a network environment 900 may communicate with an external electronic device 902 via a first network 998 (e.g., a short-range wireless communication network), or an external electronic device 904 or a server 908 via a second network 999 (e.g., a long-range wireless communication network). According to an embodiment of the disclosure, the electronic device 901 may communicate with the external electronic device 904 via the server 908. According to an embodiment of the disclosure, the electronic device 901 may include a processor 920, a memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments of the disclosure, at least one of the components (e.g., the connecting terminal 978) may be omitted from the electronic device 901, or one or more other components may be added in the electronic device 901. In some embodiments of the disclosure, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment of the disclosure, as at least part of the data processing or computation, the processor 920 may store a command or data received from another component (e.g., the sensor module 976 or the communication module 990) in a volatile memory 932, process the command or the data stored in the volatile memory 932, and store resulting data in a non-volatile memory 934. According to an embodiment of the disclosure, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., a sleep) state, or together with the main processor 921 while the main processor 921 is in an active state (e.g., executing an application). According to an embodiment of the disclosure, the auxiliary processor 923 (e.g., an image signal processor or a communication processor) may be implemented as part of another component (e.g., the camera module 980 or the communication module 990) functionally related to the auxiliary processor 923. According to an embodiment of the disclosure, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by other component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving calls. According to an embodiment of the disclosure, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment of the disclosure, the display module 960 may include a touch sensor adapted to detect a touch, or a pressure sensor adapted to measure the intensity of force incurred by the touch.

The audio module 970 may convert a sound into an electrical signal and vice versa. According to an embodiment of the disclosure, the audio module 970 may obtain the sound via the input module 950, or output the sound via the sound output module 955 or a headphone of an external electronic device (e.g., the external electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment of the disclosure, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the external electronic device 902) directly (e.g., wiredly) or wirelessly. According to an embodiment of the disclosure, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the external electronic device 902). According to an embodiment of the disclosure, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 979 may include, for example, a motor, a piezoelectric element, or an electric stimulator.

The camera module 980 may capture a still image or moving images. According to an embodiment of the disclosure, the camera module 980 may include one or more lenses, image sensors, image signal processors, or flashes.

The power management module 988 may manage power supplied to the electronic device 901. According to one embodiment of the disclosure, the power management module 988 may be implemented as at least part of, for example, a power management integrated circuit (PMIC).

The battery 989 may supply power to at least one component of the electronic device 901. According to an embodiment of the disclosure, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the external electronic device 902, the external electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment of the disclosure, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the millimeter wave (mmWave) band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the external electronic device 904), or a network system (e.g., the second network 999). According to an embodiment of the disclosure, the wireless communication module 992 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment of the disclosure, the antenna module 997 may include an antenna including a radiating element including a conductive material or a conductive pattern formed in or on a substrate (e.g., a printed circuit board (PCB)). According to an embodiment of the disclosure, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment of the disclosure, another component (e.g., a radio frequency integrated circuit (RFIC)) other than the radiating element may be additionally formed as part of the antenna module 997.

According to various embodiments of the disclosure, the antenna module 997 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 901 and the external electronic device 904 via the server 908 coupled with the second network 999. Each of the external electronic devices 902 or 904 may be a device of a same type as, or a different type, from the electronic device 901. According to an embodiment of the disclosure, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment of the disclosure, the external electronic device 904 may include an internet-of-things (IOT) device. The server 908 may be an intelligent server using machine learning and/or a neural network. According to an embodiment of the disclosure, the external electronic device 904 or the server 908 may be included in the second network 999. The electronic device 901 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 940) including one or more instructions that are stored in a storage medium (e.g., an internal memory 936 or an external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 10:
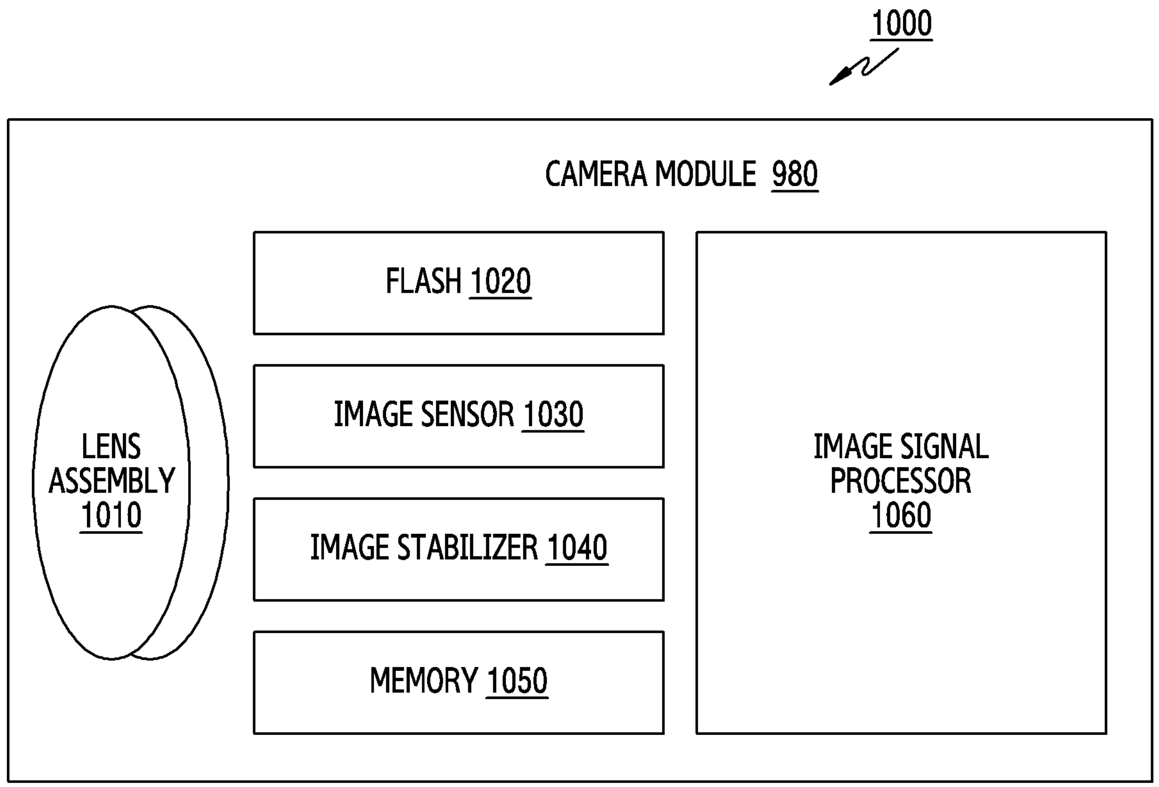
FIG. 10 is a block diagram illustrating a camera module according to an embodiment of the disclosure.

FIG. 10 is a block diagram 1000 illustrating a camera module according to an embodiment of the disclosure.

Referring to FIG. 10, the camera module 980 may include a lens assembly 1010, a flash 1020, an image sensor 1030, an image stabilizer 1040, a memory 1050 (e.g., buffer memory), or an image signal processor 1060. The lens assembly 1010 may collect light emitted or reflected from an object whose image is to be taken. The lens assembly 1010 may include one or more lenses. According to an embodiment of the disclosure, the camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce light reflected from an object. According to an embodiment of the disclosure, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to an embodiment of the disclosure, the image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment of the disclosure, the image stabilizer 1040 may detect such a movement by the camera module 980 or the electronic device 901 using a gyro sensor (not shown) or an acceleration sensor (not shown) disposed inside or outside the camera module 980. According to an embodiment of the disclosure, the image stabilizer 1040 may be implemented, for example, as an optical image stabilizer. The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display module 960. Thereafter, if a specified condition is met (e.g., by a user's input or system command), at least part of the raw image stored in the memory 1050 may be obtained and processed, for example, by the image signal processor 1060. According to an embodiment of the disclosure, the memory 1050 may be configured as at least part of the memory 930 or as a separate memory that is operated independently from the memory 930.

The image signal processor 1060 may perform one or more image processing with respect to an image obtained via the image sensor 1030 or an image stored in the memory 1050. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display module 960, the external electronic device 902, the external electronic device 904, or the server 908) outside the camera module 980. According to an embodiment of the disclosure, the image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display module 960 as it is or after being further processed.

According to an embodiment of the disclosure, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a camera;

memory comprising one or more storage media storing instructions; and at least one processor comprising processing circuitry communicatively coupled to the camera and the memory, wherein the instructions, when executed by the at least one processor individually or collectively, cause the electronic device to:

acquire image frames comprising a first image frame and a second image frame by using the camera, when an object related to motion is recognized in the first image frame, detect a first position of the object relative to a first axis, and identify a first direction in which the object is oriented, determine whether the first direction corresponds to a first state where an angular value between the first direction and the first axis is within a first critical range, identify a second direction in which the object recognized in the second image frame following the first image frame is oriented, determine whether the first direction and the second direction are different and whether the second direction corresponds to a second date where an angular value between the second direction and the first axis is within a second critical range, recognize a first motion gesture, in response to the first direction corresponding to the first state, the first direction and the second direction being different, and the second direction corresponding to the second state, and perform a first function corresponding to the first motion gesture in response to recognizing the first motion gesture.

2. The electronic device of claim 1, wherein the object is a user's hand.

3. The electronic device of claim 1, wherein the first critical range corresponds to a range less than or equal to a first angular value, the second critical range corresponds to a range greater than or equal to a second angular value, and wherein the first angular value has a smaller value than the second angular value.

4. The electronic device of claim 1, wherein the instructions, when executed by the at least one processor individually or collectively, further cause the electronic device to:

acquire the image frames from the camera, and in response to the object that satisfies a specified condition being recognized in a first number of consecutive image frames among the image frames, determine, as the first direction, an orientation vector of the recognized object relative to the first axis in the first image frame following the first number of image frames.

5. The electronic device of claim 1, wherein the first axis corresponds to a direction in which the camera is oriented.

6. The electronic device of claim 1, further comprising a motion sensor, wherein the instructions, when executed by the at least one processor individually or collectively, further cause the electronic device to:

while the image frames are acquired, acquire motion data corresponding to a movement of the electronic device by using the motion sensor, correct the first direction and the second direction, based on the motion data, and recognize the first motion gesture, in response to the corrected first direction corresponding to the first state and the corrected second direction corresponding to the second state.

7. The electronic device of claim 1, wherein the instructions, when executed by the at least one processor individually or collectively, further cause the electronic device to:

when the object is recognized in the first image frame, determine an orientation vector of the recognized object relative to the first axis as the first direction, in response to the first direction corresponding to the first state, determine whether a number of image frames acquired between the first image frame and the second image frame is less than a second number, in response to the number of image frames being less than the second number, determine, as the second direction, an orientation vector of the recognized object relative to the first axis in the second image frame, and in response to the second direction corresponding to the second state, recognize the first motion gesture.

8. The electronic device of claim 1, wherein the first motion gesture comprises a swipe gesture.

9. The electronic device of claim 1, wherein the instructions, when executed by the at least one processor individually or collectively, further cause the electronic device to:

determine whether the first direction corresponds to a third state where an angular value between the first direction and the first axis is within a third critical range, determine whether the first direction and the second direction are oriented in a same direction with respect to the first axis and whether the second direction corresponds to a fourth state where an angular value between the second direction and the first axis is within a fourth critical range, recognize a second motion gesture, in response to the first direction corresponding to the third state, the first direction and the second direction being oriented in the same direction with respect to the first axis, and the second direction corresponding to the fourth state, and in response to recognizing the second motion gesture, perform a second function corresponding to the second motion gesture.

10. The electronic device of claim 9, wherein the second motion gesture comprises a tap gesture.

11. A method of operating an electronic device, the method comprising:

acquiring image frames comprising a first image frame and a second image frame by using a camera comprised in the electronic device;

when an object related to motion is recognized in the first image frame, detecting a first position of the object relative to a first axis, and identify a first direction in which the object is oriented;

determining whether the first direction corresponds to a first state where an angular value between the first direction and the fist axis is within a first critical range;

identifying a second direction in which the object recognized in the second image frame following the first image frame is oriented;

determining whether the first direction and the second direction are different and whether the second direction corresponds to a second state where an angular value between the second direction and the first axis is within a second state recognizing a first motion gesture, in response to the first direction corresponding to the first state, the first direction and the second direction being different, and the second direction corresponding to the second state; and in response to recognizing the first motion gesture, performing a first function corresponding to the first motion gesture.

12. The method of claim 11, wherein the detecting of the first position of the object relative to the first axis, and the identifying of the first direction in which the object is oriented comprises:

determining whether the object satisfying a specified condition is recognized in a first number of consecutive image frames among the image frames; and in response to the object that satisfies the specified condition being recognized in the first number of consecutive image frames, determining, as the first direction, an orientation vector of the recognized object relative to the first axis in the first image frame following the first number of image frames.

13. The method of claim 11, wherein the determining of whether the first direction corresponds to the first state where the angular value between the first direction and the first axis is within the first critical range comprises:

while the image frames are acquired, acquiring motion data corresponding to a movement of the electronic device by using a motion sensor comprised in the electronic device;

correcting the first direction, based on the motion data; and determining whether the corrected first direction corresponds to the first state.

14. The method of claim 13, wherein the determining of whether the second direction corresponding to the second state where an angular value between the second direction and the first axis is within a second state comprises:

while the image frames are acquired, acquiring motion data corresponding to the movement of the electronic device by using a motion sensor comprised in the electronic device;

correcting the second direction, based on the motion data; and determining whether the corrected second direction corresponds to the second state.

15. The method of claim 11, further comprising:

when the object is recognized in the first image frame, determining an orientation vector of the recognized object relative to the first axis as the first direction;

in response to the first direction corresponding to the first state, determining whether a number of image frames acquired between the first image frame and the second image frame is less than a second number;

in response to the number of image frames being less than the second number, determining, as the second direction, an orientation vector of the recognized object relative to the second direction in the second image frame; and in response to the second direction corresponding to the second state, recognizing the first motion gesture.

16. The method of claim 11, wherein the object is a user's hand.

17. The method of claim 11, wherein the first critical range corresponds to a range less than or equal to a first angular value, the second critical range corresponds to a range greater than or equal to a second angular value, and wherein the first angular value has a smaller value than the second angular value.

18. The method of claim 11, wherein the first axis corresponds to a direction in which the camera is oriented.

19. The method of claim 11, further comprising:

determining whether the first direction corresponds to a third state where an angular value between the first direction and the first axis is within a third critical range;

determining whether the first direction and the second direction are oriented in a same direction with respect to the first axis and whether the second direction corresponds to a fourth state where an angular value between the second direction and the first axis is within a fourth critical range;

recognizing a second motion gesture, in response to the first direction corresponding to the third state, the first direction and the second direction being oriented in the same direction with respect to the first axis, and the second direction corresponding to the fourth state; and in response to recognizing the second motion gesture, performing a second function corresponding to the second motion gesture.

20. The method of claim 19, wherein the second motion gesture comprises a tap gesture.

* * * * *